(12) United States Patent
Ratasuk et al.

(10) Patent No.: US 12,127,146 B2
(45) Date of Patent: Oct. 22, 2024

(54) ENHANCING TIMING ADVANCE VALIDITY IN PRECONFIGURED UPLINK RESOURCE FOR WIRELESS NETWORKS

(71) Applicant: Nokia Technologies Oy, Espoo (FI)

(72) Inventors: Rapeepat Ratasuk, Inverness, IL (US); Nitin Mangalvedhe, Hoffman Estates, IL (US); Ryan Keating, Chicago, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 381 days.

(21) Appl. No.: 17/607,198

(22) PCT Filed: May 1, 2020

(86) PCT No.: PCT/IB2020/054124
§ 371 (c)(1),
(2) Date: Oct. 28, 2021

(87) PCT Pub. No.: WO2020/222180
PCT Pub. Date: Nov. 5, 2020

(65) Prior Publication Data
US 2022/0225258 A1 Jul. 14, 2022

Related U.S. Application Data

(60) Provisional application No. 62/842,530, filed on May 2, 2019.

(51) Int. Cl.
*H04W 56/00* (2009.01)
*H04L 27/26* (2006.01)
(Continued)

(52) U.S. Cl.
CPC ..... *H04W 56/0045* (2013.01); *H04L 27/2607* (2013.01); *H04W 72/0446* (2013.01); *H04W 72/20* (2023.01)

(58) Field of Classification Search
CPC ............ H04W 56/0045; H04W 72/20; H04W 27/2607; H04W 72/0446
(Continued)

(56) References Cited

U.S. PATENT DOCUMENTS

2013/0083741 A1* 4/2013 Larsson ................ H04W 52/48
370/329
2018/0097679 A1 4/2018 Zhang et al.
(Continued)

FOREIGN PATENT DOCUMENTS

| CN | 102893679 A | 1/2013 |
| CN | 104756421 A | 7/2015 |
| GB | 2581173 A | 8/2020 |

OTHER PUBLICATIONS

Cayron et al., Resource Allocation, Aug. 12, 2020, GB 2581173 (Year: 2019).*

(Continued)

*Primary Examiner* — Sai Ming Chan
(74) *Attorney, Agent, or Firm* — Lippes Mathias LLP

(57) ABSTRACT

According to an example embodiment, a method may include receiving, by a user equipment from a base station associated with a cell, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and transmitting, by the user equipment, data via the
(Continued)

resources allocated to the user equipment within the preconfigured uplink resource (PUR) subframe.

17 Claims, 8 Drawing Sheets

(51) Int. Cl.
*H04W 72/0446* (2023.01)
*H04W 72/20* (2023.01)

(58) Field of Classification Search
USPC .......................................................... 370/503
See application file for complete search history.

(56) References Cited

U.S. PATENT DOCUMENTS

2019/0320467 A1* 10/2019 Freda ................. H04W 74/004
2022/0007391 A1* 1/2022 Höglund ............... H04W 72/21
2022/0078739 A1* 3/2022 Zhang ............... H04W 56/0045

OTHER PUBLICATIONS

"New WID on Rel-16 MTC enhancements for LTE", 3GPP TSG RAN Meeting #80, RP-181450, Agenda: 10.1.3, Ericsson, Jun. 11-14, 2018, 4 pages.
"New WID on Rel-16 enhancements for NB-IoT", 3GPP TSG RAN Meeting #80, RP-181451, Agenda: 10.1.3, Ericsson, Jun. 11-14, 2018, 4 pages.
"UL transmission in preconfigured resource", 3GPP TSG RAN WG1 Meeting #96, R1-1901511, Agenda: 6.2.1.2, Huawei, Feb. 25-Mar. 1, 2019, 8 pages.
"LTE-M Pre-configured UL Resources Design Considerations", 3GPP TSG RAN WG1 Meeting #96, R1-1901628, Agenda: 6.2.1.2, Sierra Wireless, Feb. 25-Mar. 3, 2019, 14 pages.
"Support for transmission in preconfigured UL resources in LTE-MTC", 3GPP TSG RAN WG1 Meeting #96, R1-1901738, Agenda: 6.2.1.2, Ericsson, Feb. 25-Mar. 1, 2019, pp. 1-18.
"Support for transmission in preconfigured UL resources for MTC", 3GPP TSG RAN WG1 Meeting #96, R1-1901858, Agenda: 6.2.1.2, ZTE, Feb. 25-Mar. 1, 2019, 13 pages.
"Discussion on preconfigured UL resources in MTC", 3GPP TSG RAN WG1 Meeting #96, R1-1902056, Agenda: 6.2.1.2, LG Electronics, Feb. 25-Mar. 1, 2019, 9 pages.
"UL transmission in preconfigured resources for eMTC", 3GPP TSG RAN WG1 Meeting #96, R1-1902146, Agenda: 6.2.1.2, Lenovo, Feb. 25-Mar. 1, 2019, 5 pages.
"Considerations in using PUR", 3GPP TSG RAN WG1 Meeting #96, R1-1902192, Agenda: 6.2.1.2, Sony, Feb. 25-Mar. 1, 2019, 5 pages.
"Discussion on transmission in preconfigured UL resources for MTC", 3GPP TSG RAN WG1 Meeting #96, R1-1902210, Agenda: 6.2.1.2, Samsung, Feb. 25-Mar. 1, 2019, pp. 1-6.
"Support for transmission in preconfigured UL resources", 3GPP TSG RAN WG1 Meeting #96, R1-1902367, Agenda: 6.2.1.2, Qualcomm Incorporated, Feb. 25-Mar. 1, 2019, pp. 1-13.
"UL transmission in preconfigured resources for eMTC", 3GPP TSG RAN WG1 Meeting #96, R1-1902451, Agenda: 6.2.1.2, Intel Corporation, Feb. 25-Mar. 1, 2019, pp. 1-9.
"Consideration for preconfigured uplink resources (PUR)", 3GPP TSG RAN WG1 Meeting #95, R1-1902552, Agenda: 6.2.1.2, Sequans Communications, Feb. 25-Mar. 1, 2019, 6 pages.
"Discussion on preconfigured UL resources in MTC", 3GPP TSG RAN WG1 Meeting #96, R1-1902776, Agenda: 6.2.1.2, NTT Docomo, Inc, Feb. 25-Mar. 1, 2019, 4 pages.
International Search Report and Written Opinion received for corresponding Patent Cooperation Treaty Application No. PCT/IB2020/054124, dated Jul. 2, 2020, 16 pages.
"Feature lead summary of Support for transmission in preconfigured UL resources", 3GPP TSG RAN WG1 Meeting #94b, R1-1811697, Agenda: 6.2.2.2, Huawei, Oct. 8-12, 2018, 13 pages.
"Evaluation on CP types for UL transmission", 3GPP TSG RAN WG1 Meeting #87, R1-1611198, Agenda: 7.1.1, Huawei, Nov. 14-18, 2016, 5 pages.
"Considerations for Preconfigured UL Resources in A-MTC", 3GPP TSG RAN WG1 Meeting #94bis, R1-1810649, Agenda: 6.2.1.2, Sony, Oct. 8-12, 2018, 5 pages.
Office Action received for corresponding Chinese Patent Application No. 202080048595.1, dated Jun. 27, 2024, 11 pages of Office Action and no page of translation available.
Hong et al., "Research on Interference Suppression in Generalized Frequency Division Multiplex System", Journal of Shanghai Jiao tong University, vol. 51, No. 9, Sep. 2017, pp. 1117-1123.
Hongyan, "Optimization design and implementation of channel allocation model for cellular networks", Modern Electronics Technique, vol. 40 No. 2, Jan. 2017, pp. 73-77.

* cited by examiner

ENHANCING TIMING ADVANCE VALIDITY IN PRECONFIGURED UPLINK RESOURCE FOR WIRELESS NETWORKS

RELATED APPLICATION

This application claims priority to PCT Application No. PCT/IB2020/054124, filed on 1 May 2020, which claims priority to U.S. Application No. 62/842,530, filed on 2 May 2019, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: receiving, by a user equipment from a base station associated with a cell, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and transmitting, by the user equipment, data via the resources allocated to the user equipment within the preconfigured uplink resource (PUR) subframe.

According to an example embodiment, an apparatus may include means for receiving, by a user equipment from a base station associated with a cell, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and means for transmitting, by the user equipment, data via the resources allocated to the user equipment within the preconfigured uplink resource (PUR) subframe.

According to an example embodiment, an apparatus may include: at least one processor; and at least one memory including computer program code; the at least one memory and the computer program code configured to, with the at least one processor, cause the apparatus at least to: receive, by a user equipment from a base station associated with a cell, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and transmit, by the user equipment, data via the resources allocated to the user equipment within the preconfigured uplink resource (PUR) subframe.

According to an example embodiment, a non-transitory computer-readable storage medium comprising instructions stored thereon that, when executed by at least one processor, are configured to cause a computing system to perform a method of: receiving, by a user equipment from a base station associated with a cell, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and transmitting, by the user equipment, data via the resources allocated to the user equipment within the preconfigured uplink resource (PUR) subframe.

According to an example embodiment, a method may include: transmitting, by a base station associated with a cell, to a user equipment, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and receiving, by the base station from the user equipment, data via the resources allocated to the user equipment within the preconfigured uplink resource (PUR) subframe.

According to an example embodiment, an apparatus may include means for transmitting, by a base station associated with a cell, to a user equipment, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and means for receiving, by the base station from the user equipment, data via the resources allocated to the user equipment within the preconfigured uplink resource (PUR) subframe.

According to an example embodiment, an apparatus may include: at least one processor; and at least one memory including computer program code; the at least one memory and the computer program code configured to, with the at least one processor, cause the apparatus at least to: transmit, by a base station associated with a cell, to a user equipment, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and receive, by the base station from the user equipment, data via the resources allocated to the user equipment within the preconfigured uplink resource (PUR) subframe.

According to an example embodiment, a non-transitory computer-readable storage medium comprising instructions stored thereon that, when executed by at least one processor, are configured to cause a computing system to perform a method of: transmitting, by a base station associated with a cell, to a user equipment, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and receiving, by the base station from the user equipment, data via the resources allocated to the user equipment within the preconfigured uplink resource (PUR) subframe.

The details of one or more examples of embodiments are set forth in the accompanying drawings and the description below. Other features will be apparent from the description and drawings, and from the claims.

DETAILED DESCRIPTION

Figure 1:
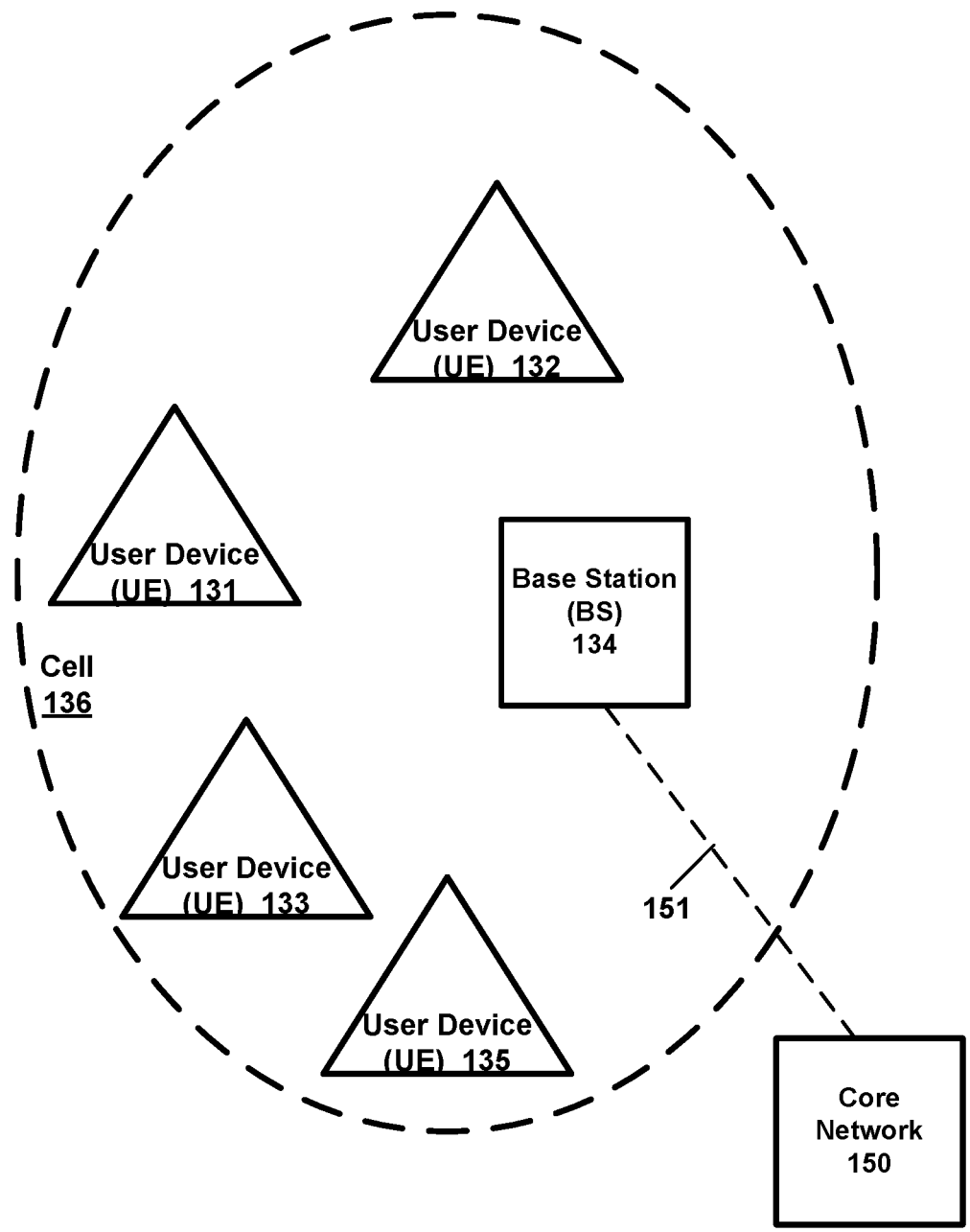
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Various example implementations may relate to improving a timing advance validation for UEs. A UE may be in different states or modes, such as a Connected state (or Connected mode), an Idle state (or Idle mode), and an Inactive state (or Inactive mode). Some examples may include Radio Resource Control (RRC) modes or states, such as an RRC_Connected mode, an RRC_Idle mode, and an RRC_Inactive mode.

In a Connected mode, the UE may maintain a RRC context that may be used by the UE to communicate with the cell to which the UE is connected. Part of the context or information used by the UE to transmit may include a timing advance (TA), which is used by the UE to control the timing of the uplink transmission to the cell, e.g., to ensure that uplink transmissions from different UEs are synchronized when received by the BS, and do not interfere with other transmissions. Also, in Connected mode, the network (e.g., BS and/or core network) may control the mobility (e.g., which cell the UE is or should be connected to, and whether a handover to a target cell should be performed) of the UE. For example, a network may make handover decisions for a UE based on measurement reports transmitted by the UE to the cell. The cell the UE is connected to may be considered the serving cell in Connected mode (since this cell is serving the UE).

In order to conserve power, a UE may, for example, transition from a Connected mode to an Idle or Inactive mode, e.g., in which the UE may sleep (a low power state) much of the time while in Idle or Inactive mode. In Idle mode, the UE does not have a connection established with any cell, and mobility (e.g., determining which cell the UE will be camped on or which cell to select as the serving cell for the UE) is controlled by the UE. While in Idle mode, the UE may sleep much of the time, and then periodically wake (e.g., changing from a low power state to a full-power state) to perform one or more tasks or processes, e.g., such as receiving system information from the cell the UE may be camped on (the serving cell for the UE while in Idle mode), detecting a paging message (a paging message detected by the UE may indicate that the network has data for downlink transmission to the UE), and a cell search and selection process in which the UE may measure reference signals from various cells, and then select a cell (or reselect the same cell) to camp on (as the serving cell), based on the received signals from various cells. Thus, as an example, cell selection may include selecting a cell that has a strongest reference signal received power (RSRP), or other signal parameter. Thus, in Idle mode, the serving cell may be referred to as the cell the UE has camped on. For example, a UE may typically receive system information (e.g., via receiving one or more broadcast system information blocks (SIBS)) from the serving cell (or the cell the UE is camping on) while the UE is awake in Idle mode.

According to an example embodiment, a UE in connected mode may be configured by a cell or BS with a pre-configured uplink resource (PUR) or grant-free uplink resource to be used later by the UE while the UE may be in Idle mode or any other mode. For example, the preconfigured uplink resource (PUR) may be used by the UE when the UE is in Idle mode, in connected mode, Inactive mode, or other mode (or state). According to an example embodiment, the PUR resources may be dedicated resources (dedicated to a UE), and may be contention-free. Other types of PUR resources may also be used. The PUR resources may be configured by the BS/eNB/gNB for the UE. In an example embodiment, the PUR (preconfigured uplink resources) resources or PUR configuration may be configured solely by the BS, e.g., without being prompted or requested by the UE. Thus, in an example embodiment, the configuration of PUR resources assigned or allocated to the UE may be solely up to the network (e.g., BS and/or core network). Thus, for example, the configured PUR resource(s) may be used by a UE while in Idle mode to transmit data, without (at least in some cases) requiring the UE to establish a connection with the cell before transmitting data.

For instance, the network may have information about the subscription status of the UE. For example, the subscription status may indicate that this UE is a stationary data collection and reporting device, e.g., a power meter UE (to periodically collect and report power usage), or a water meter UE (e.g., to periodically collect and report water usage data). For example, the water meter UE may mostly remain sleeping (low power state) and in Idle mode. And, for example, once per day (every 24 hours), the water meter UE may wake, and while still in Idle mode, the water meter UE may use the PUR configured resources to transmit data to the cell or BS to report the water usage. Thus, based on the subscription status, the network (e.g., BS/eNB/gNB and/or core network) may therefore know that the UE will need to transmit uplink reports periodically, e.g., every 24 hours, as an example. Or the network may observe that this UE is transmitting uplink data periodically.

Therefore, according to an example embodiment, the network may send control information (a PUR configuration) to configure the UE to transmit uplink data periodically e.g., every 24 hours, via the configured PUR resources. Thus, a PUR configuration (which may be communicated to the UE via higher-layer or physical layer control information) may be sent by the BS/cell to the UE, where the BS may configure various details or parameters of the PUR configuration, such as a start time and periodicity of uplink report, an indication of the uplink (e.g., time-frequency) resources within one or more subframes that are allocated to the UE, a set of timing advance (TA) validation criteria, and/or other configuration parameters. Then, at least in some cases, the UE, while in Idle mode, may wake up, e.g., once per day, and transmit the uplink report via the configured PUR resources without needing to first establish a connection to the cell or BS. Thus, a power savings and a decrease in signaling overhead may be achieved since the UE may be able to transmit its report via the PUR resources while in Idle mode, without needing to establish a connection (e.g., via a random access procedure) to the cell.

A subframe that has been assigned to the UE to transmit data via the configured PUR resources may be referred to as a PUR subframe. A plurality of subframes may be configured as PUR subframes for uplink transmission by the UE. Also, the BS/eNB/gNB may mark this PUR subframe(s) as invalid (e.g., to reserve the configured PUR subframe(s) for the one or more UEs and invalid for other UEs not configured to use the subframe(s)), using one or more bits transmitted via broadcast system information, so that other UEs do not transmit during the PUR subframe(s). For instance, other UEs will postpone or skip transmission when they encounter PUR subframe(s).

Figure 2:
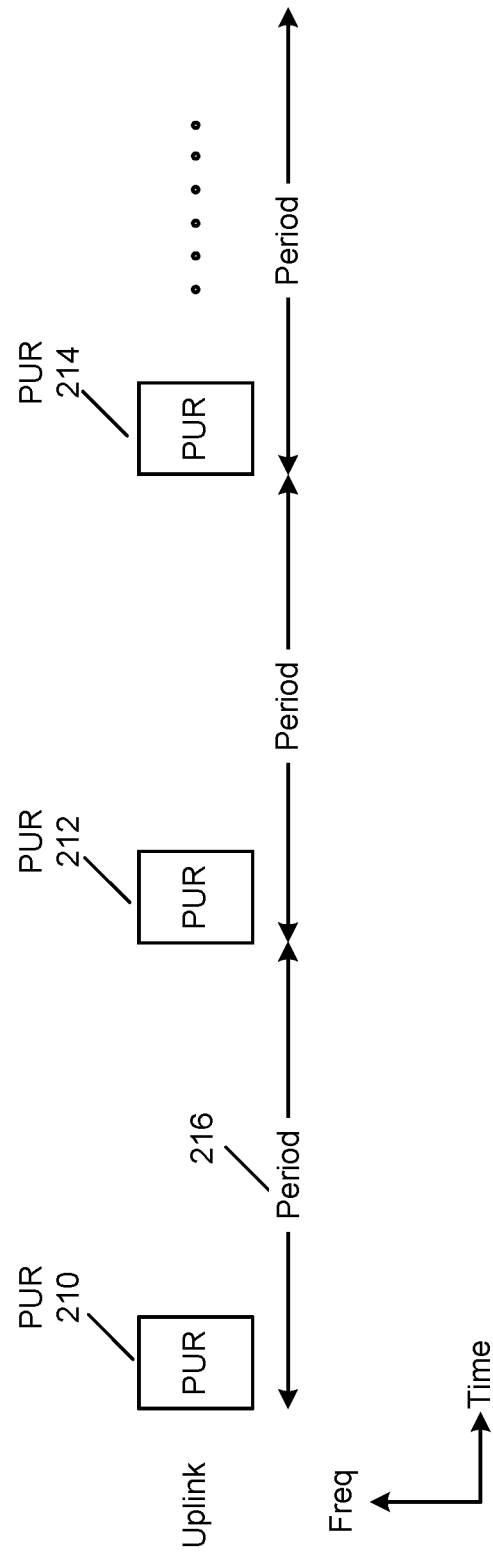
FIG. 2 is a diagram illustrating configured PUR resources according to an example embodiment.

FIG. 2 is a diagram illustrating configured PUR resources according to an example embodiment. For example, a PUR configuration (e.g., which may be transmitted to the UE via downlink control information) may identify time-frequency resource allocation(s) (e.g., for one or more subframes), a starting subframe, a periodicity of the PUR resources allocated to the UE, and a set of timing advance validation criteria (e.g., to be used by the UE to validate the timing advance it last received while connected to the cell), and/or other parameters. As shown in FIG. 2, the PUR configuration includes PUR resources 210, 212, 214, . . . allocated to the UE, with a period 216 (e.g., a PUR resource is allocated every period 216).

According to an example embodiment, a UE may be configured with PUR (which may later be used in Idle mode, and thus, may be referred to as an Idle mode PUR configuration) while in RRC connected mode. The PUR configuration may include, for example, one or more of the following: Configuration related to the uplink data transmission e.g., starting subframe, periodicity, time/frequency resource allocation, MCS (modulation and coding scheme), TBS (transport block size), number of repetitions, number of transport blocks, HARQ process numbers, power control setting, etc. Configuration related to timing advance (TA) validation criteria (e.g., time alignment timer value, RSRP change threshold(s), . . . ) for the UE to validate its TA prior to uplink data transmission (e.g., while in Idle mode); Configuration related to control channel monitoring, e.g., to receive ACK/NACK or RLC acknowledgment or control messages such as PUR release, modification or reconfiguration. Configuration related to PUR release and fallback, e.g., UE to automatically release PUR resources if there has been no transmission for N occasions, or UE to fall back to RRC connected mode when the uplink data buffer size is greater than K bits. Also, for example, when UE is released by the network from Connected mode into Idle or Inactive mode, the UE may then follow idle-mode PUR configuration (e.g., to transmit while in Idle or Inactive mode). Configuration related to applicable cells, e.g., list of cell IDs for which PUR configuration is valid.

While in Idle mode, the UE may continue to move or travel to different locations, which may be various locations within the same serving cell (that it was last connected to), or the UE may travel or move to a location that is within a different cell (e.g., to a location in which the serving cell for the UE may have changed). In order to transmit data while remaining in Idle mode, the timing advance (TA) stored in memory of the UE, e.g., which was received when the UE was last connected to a cell, should be valid. A new timing advance may be obtained by the UE by performing a random access procedure (e.g., TA received via msg2 (random access response) of random access procedure). However, as noted, a power saving and a decrease in signaling overhead may be achieved if the UE can use the PUR resources to transmit data to the cell while in Idle mode based on the stored timing advance, without establishing a connection to the cell (e.g., via a random access procedure). Thus, for example, while in Idle mode, a UE may perform a timing advance validation based on the timing advance validation criteria (to validate or confirm that the timing advance stored in memory is still valid), before transmitting data via the PUR resource.

While in Idle mode, the UE may receive and measure signals from various cells, and select a serving cell (the cell that the UE will be camping on). If the UE selects the same serving cell that provided the stored timing advance (meaning that the serving cell has not changed since the UE was in connected mode to receive the timing advance), or if the UE can still communicate (e.g. the signal-to-noise ratio is above a threshold) with the same serving cell that provided the stored timing advance, the timing advance may be valid, and in some cases, 1 or more other TA validation criteria may be evaluated to determine that the TA is valid (e.g., time alignment timer, and/or RSRP change, or other value).

Therefore, according to an example embodiment, the PUR configuration provided by the BS to the UE may include timing advance validation criteria, which may be used by the UE to validate (or confirm) the timing advance before transmitting data in Idle mode to the BS using the PUR resource. According to an example embodiment, several TA validation criteria may be used, such as, for example:

1) First, the UE may confirm that the serving cell (in Idle mode), which is the cell the UE is camping on in Idle mode, has not changed (confirm that the serving cell in Idle mode is the same as the serving cell from which the UE received the PUR configuration and the timing advance while in connected mode) or that the cell is part of the PUR configuration. For example, a timing advance may only be valid if the Idle mode serving cell is the same as the serving cell in connected mode that provided the timing advance.

According to an example embodiment, if the serving cell has not changed or if the cell belongs to a list of valid cells, then additional criteria may be evaluated to determine if the timing advance is still valid, such as, for example: 2) a time alignment timer for Idle mode. The time alignment timer, may be reset when a new timing advance is received, and may indicate an invalid (e.g., expired) timing advance when the time alignment timer has expired; and/or 3) a serving cell reference signal received power (RSRP) change. Thus, for example, if the difference between the connected mode RSRP from the serving cell and the Idle mode RSRP from the same serving cell is greater than a threshold, then this may cause the UE to invalidate the timing advance. Other TA validation criteria may be used as well.

Also, according to an example embodiment, the TA validation step can be disabled by the BS/eNB/gNB (or, alternatively, the BS/eNB can configure the validation criteria such that the stored timing advance will be (e.g., always) valid). For example, the disabling of the TA validation may be useful in (1) small cells where TA adjustment is not needed or (2) if the BS/eNB/gNB knows that the UE is stationary. For instance, indoor hotspots may have a range of only 20 m and therefore timing advance adjustment is not needed. Thus, for example, a TA validation may not be required (e.g., so long as the serving cell has not changed) for a UE that is stationary, or moves very little, such as for certain types of UEs (e.g., water meter UEs, traffic light UEs), and/or for small cell sizes. In such cases, the UE's distance to the BS will not change that much, and hence, the timing advance should still be valid.

However, for example, in other cases, or where the TA validation has not been disabled, such as, for example, for cells with a larger cell radius (larger cell size), TA validation may be an issue for mobile UEs. The two example attributes or criteria, as described in the example above, that may be used for TA validation may include time alignment timer for Idle mode, and/or serving cell RSRP changes. However, both of these attributes are not very effective at indicating whether the UE has moved sufficiently far away from its earlier position since going into Idle mode to require a TA adjustment (while still in the same serving cell). If a UE transmits with an incorrect TA, it will suffer performance loss due to inter-symbol interference as well as create intra-cell interference to other UEs. Therefore, a BS/eNB/gNB may set conservative thresholds for those attributes such that a UE in many cases will not use PUR due to failing the TA validation criteria. This, however, is also problematic as the UE will then perform initial access (e.g., random access procedure) to connect to the cell and transmit data, which requires a large overhead and longer latency.

Therefore, there may be a need for one or more techniques to enhance timing advance validation, such as, for example, for mobile UEs in cells with larger cell radius, and/or to provide one or more techniques to ensure a timing advance is valid (or sufficient) accommodate a variety of cell sizes and/or UE types.

According to an example embodiment, a cyclic prefix (CP) may be a guard time, added to a beginning of a symbol or group of symbols. The CP may typically include a copy or replica of a last portion of a symbol. Typically, a length or duration of a CP is chosen to be longer than a maximum delay spread of the wireless channel, e.g., to protect the transmitted signal from inter-symbol interference (ISI).

According to an example embodiment, at least in some cases, an extended CP, longer than a normal CP, may be selected or configured for a PUR subframe to also accommodate timing uncertainty of the UE within the cell caused by movement of the UE within the cell, e.g., during Idle mode. Thus, according to an example embodiment, at least in some cases, a PUR subframe may be configured to include symbols with an extended cyclic prefix (extended CP), that is longer than a normal CP, e.g., to increase a cell size or cell range where a TA validation may be unnecessary for a UE. Because a CP adds overhead to signal transmission, a CP that is longer than necessary is inefficient, and should be avoided. Thus, for example, an extended CP, longer than a normal CP, may be used, at least in some cases, for a PUR subframe. Also, for example, a normal CP (shorter than the extended CP) may be used or configured for the UE for one or more other (e.g., non-PUR) subframes, e.g., which may be configured for the UE. By configuring a PUR subframe to use a longer CP, e.g., an extended CP, this may allow the extended CP to accommodate both channel delay spread and the UE timing uncertainty within the cell caused by movement of the UE within the cell (e.g., while in Idle mode).

After storing the TA value received in the Connected mode, if the UE moves away from the BS/eNB/gNB during Idle mode or Inactive mode, the stored TA value (previously stored) is smaller than the TA value for ideal uplink reception. This means that an uplink transmission in the PUR using the stored TA value will be delayed, but the delay may still be within the extended CP and there are no interference issues. On the other hand, if the UE moves closer to the BS/eNB/gNB, the stored TA value is larger than the TA value for ideal reception. Therefore, an uplink transmission in the PUR with the stored TA value begins too early, which causes inter-symbol interference to the UE as well as interference to other UEs transmitting in adjacent resource blocks. In this case, if the UE is pre-emptively instructed to reduce the TA value, even if the UE moves closer to the BS/eNB/gNB, an uplink transmission in the PUR would not begin too early and cause interference.

Figure 3:
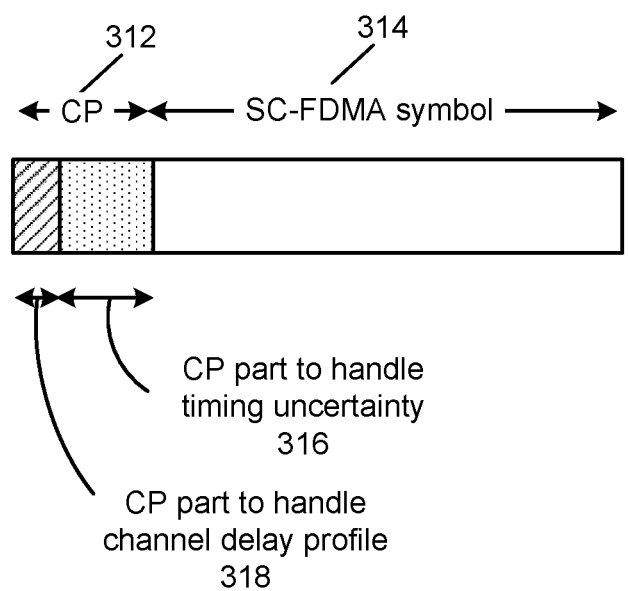
FIG. 3 is an extended cyclic prefix according to an example embodiment.

FIG. 3 is an extended cyclic prefix according to an example embodiment. As shown in FIG. 3, an extended cyclic prefix (CP) 312 is prepended to a symbol 314. Extended CP may include a CP part 318 to account for or accommodate channel delay spread for the wireless channel between the UE and serving cell/BS, and a CP part 316 to account for or accommodate the UE timing uncertainty within the cell caused by movement of the UE within the cell (e.g., while UE is in Idle mode). In an embodiment, a BS/eNB/gNB may configure one or more PUR subframes using extended CP and one or more other (e.g., non-PUR) subframes using normal CP. In an example embodiment, the PUR subframes may be marked as invalid (or reserved and/or unavailable) subframes in system information (e.g., SIB) that is broadcast by the serving cell, and these PUR frames are used by UEs configured to transmit on those subframes.

According to an example embodiment, use of an extended CP may allow a change or adjustment to TA validation configuration for the PUR subframe, even for larger cells, to thereby improve PUR resource usage, since, for example, the UE may be more likely to use the PUR resources for uplink transmission, while also, at least in some cases, reducing TA validation processing overhead at the UE. Also, in an example embodiment, at least in some cases, the BS/eNB/gNB may configure a PUR subframe to use an extended CP in order to increase cell range where a TA validation is unnecessary after the UE has confirmed that the serving cell has not changed (e.g., after UE has confirmed that the Idle mode serving cell is same as the connected mode serving cell that provided the timing advance to the UE) or if the cell is part of the valid set of cells.

For example, with the use of a extended CP that may accommodate (or account for) both the channel delay spread and the UE timing uncertainty of the UE due to UE movement within the cell, (e.g., during Idle mode), one or more TA validation adjustments or TA validation configurations may be performed (or provided) by a BS/eNB/gNB, e.g., to improve PUR resource usage, even for larger cells and/or for higher mobility UEs. Some example TA validation changes or TA validation configurations that may be used to improve PUR resource usage when an extended CP is configured for a PUR subframe, may include, for example: 1) a timing advance (TA) validation criteria for the UE with respect to the serving cell for the PUR subframe may be adjusted (e.g., relaxed) to make TA more likely to be valid (e.g., by relaxing one or more thresholds used for TA validation criteria); or 2) a TA validation for the UE with respect to the serving cell may be disabled for the PUR subframe; or 3) one or more parameters of a TA validation criteria for the UE with respect to the serving cell for the PUR subframe may be configured, such that the timing advance will be determined by the UE as valid if the serving cell, which provided the timing advance to the UE during connected mode, is still a serving cell for the user equipment when a timing advance validation is performed by the user equipment (e.g., the Idle mode serving cell for the UE is the same as the Connected mode serving cell that provided the timing advance to the UE).

According to an example embodiment, a method may include receiving, by a user equipment (UE) from a base station (BS) associated with a cell, control information assigning a subframe as a preconfigured uplink resource (PUR) subframe for the UE, the preconfigured uplink resource (PUR) subframe including an extended cyclic prefix, the control information indicating resources allocated to the UE for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and, transmitting, by the UE, data via the resources allocated to the UE within the preconfigured uplink resource (PUR) subframe.

According to an example embodiment, the method may include receiving, by the UE from the BS with respect to the cell, a timing advance while the UE is in a connected mode or as part of a random access procedure with respect to the cell; transitioning, by the UE, to an Idle mode with respect to the cell; wherein the transmitting may include transmitting, by the user equipment while in Idle mode with respect to the cell, data via the resources allocated to the user equipment within the preconfigured uplink resource (PUR) subframe.

According to an example embodiment, the control information may further include control information indicating that a timing advance validation for the user equipment with respect to the cell has been disabled, or should be omitted, for the preconfigured uplink resource (PUR) subframe. The transmitting may further include transmitting, by the UE, data via the resources allocated to the user equipment within the preconfigured uplink resource (PUR) subframe, without performing a timing advance validation.

According to an example embodiment, the receiving control information may further include receiving control information indicating one or more parameters of a timing advance validation criteria, such that the timing advance will be determined as valid when the cell, which provided the timing advance, is still a serving cell for the user equipment when a timing advance validation is performed by the UE.

According to another example embodiment, the method may include receiving, by the UE: a timing advance command instructing the user equipment to adjust the timing advance to an adjusted timing advance for the user equipment with respect to the cell, and control information instructing the user equipment to use the adjusted timing advance for transmission timing for the preconfigured uplink resource (PUR) subframe while omitting the timing advance validation.

According to an example embodiment, the receiving may include receiving, by the UE from the base station, control information indicating that the preconfigured uplink resource (PUR) subframe, which has been assigned to the user equipment for uplink transmission, is marked (e.g., using one or more bits or signals within the SIB) as invalid for use with respect to other user equipments (and thus, this marked PUR frame is unavailable for use by other UEs).

According to an example embodiment, the transmitting may be performed by the user equipment using a new timing advance ($TA_{new}$) based on at least one of the following: $TA_{new}=0$, or zero timing advance, when either: 1) a bit or flag in the control information for the preconfigured uplink resource (PUR) subframe provides this indication, or when $TA_{old} \leq TA_{max}$ is satisfied where $TA_{old}$ is an initial timing advance value indicated by the control information and $TA_{max}$ is a parameter provided in the control information for the preconfigured uplink resource (PUR) subframe; or $TA_{new} = TA_{old} - \delta$ if $TA_{old} \leq TA_{threshold}$, where $TA_{old}$ is an initial timing advance value indicated by the control information and $TA_{threshold}$ and $\delta$ are provided in the control information.

According to an example embodiment, the receiving may include receiving, by the UE from the BS associated with the cell, control information assigning a subframe as a preconfigured uplink resource (PUR) subframe for the UE with respect to the cell, the preconfigured uplink resource (PUR) subframe including a cyclic prefix having a cyclic prefix length based on at least one of a size of the cell, or a mobility status of the user equipment. Control information may be provided by the BS indicating a length of the cyclic prefix, or a cyclic prefix type, for the preconfigured uplink resource (PUR) subframe. For example, control information may be provided that indicates a CP length or CP type as extended CP.

Also, for example, the extended cyclic prefix, out of a plurality of cyclic prefix types or a plurality of cyclic prefix lengths (e.g., normal CP, extended CP, . . . ), may be configured for the preconfigured uplink resource (PUR) subframe based on at least one of a size of the cell, or a mobility status of the user equipment. For example, for a small or medium size cell (where mobility or movement is limited due to a smaller size of the cell, or for a low mobility UE (e.g., a UE that moves only a limited amount, or a stationary UE), the BS may configure the PUR subframe with a normal CP. While, for a larger cell (where a UE may move more within the cell, due to larger cell size), or for normal or high mobility UEs (e.g., UEs that are not stationary or quasi-stationary), the BS may configure the PUR subframe with an extended CP. In this manner, a BS may configure an appropriate-sized CP based on the cell size (and/or UE mobility status), so that the configured CP for the PUR subframe accommodates the UE timing uncertainty due to UE movement within the cell, but without over-configuring excess CP that may not be needed (e.g., for a small cell size, or for stationary UE). Also, by configuring the appropriate CP length/type for the cell size (and/or UE mobility status), the BS may also configure the TA validation to be disabled, or otherwise provide TA validation parameters/criteria so that TA validation of the TA will be determined as valid. In this manner, the PUR resource usage may be increased, even for larger cell sizes with mobile UEs.

According to another example embodiment, a method may include transmitting, by a BS associated with a cell, to a UE, control information assigning a subframe as a preconfigured uplink resource (PUR) subframe for the UE, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the UE include a normal cyclic prefix that is shorter in time than the extended cyclic prefix of the preconfigured uplink resource (PUR) subframe; and receiving, by the BS from the UE, data via the resources allocated to the UE within the preconfigured uplink resource (PUR) subframe.

According to an example embodiment, the transmitting may include transmitting control information indicating that a timing advance validation for the user equipment with respect to the cell has been disabled, or should be omitted, for the preconfigured uplink resource (PUR) subframe.

According to an example embodiment, the transmitting may include transmitting, by a BS associated with a cell, to a UE, control information assigning a plurality of subframes as preconfigured uplink resource (PUR) subframes for the UE with respect to the cell, each of the preconfigured uplink resource (PUR) subframes including an extended cyclic prefix; wherein the transmitting control information further includes transmitting control information indicating that a timing advance validation for the user equipment with respect to the cell has been disabled, or should be omitted, for a subset of the preconfigured uplink resource (PUR) subframes. Also, the receiving may include receiving, by the BS from the UE, data via the resources allocated to the UE within the preconfigured uplink resource (PUR) subframe, in which a timing advance validation has been omitted. Also, the transmitting may include transmitting, by the BS to the UE, control information indicating one or more parameters of a timing advance validation criteria, such that the timing advance will be determined as valid when the cell, which provided the timing advance, is still a serving cell for the UE when a timing advance validation is performed by the UE.

According to an example embodiment, the method may include transmitting, by the BS to the UE: a timing advance command instructing the UE to adjust the timing advance to an adjusted timing advance for the UE with respect to the cell; and control information instructing the UE to use the adjusted timing advance for transmission timing for the preconfigured uplink resource (PUR) subframe while omitting a timing advance validation.

According to an example embodiment, the method may further include determining, by the BS, at least one of the following: that the UE has a low mobility status or is stationary; or that the cell is a small cell having a size that is less than a threshold; and transmitting, by the BS to the UE, at least one of: 1) information indicating that a timing advance validation for the UE with respect to the cell has been disabled or should be omitted by the user equipment for the preconfigured uplink resource (PUR) subframe, or 2) one or more parameters of a timing advance validation criteria, such that the timing advance will be determined by the UE as valid for the preconfigured uplink resource (PUR) subframe when the cell, which provided the timing advance, is still a serving cell (e.g., while UE is in Idle mode) for the UE when a timing advance validation is performed by the UE.

According to an example embodiment, the UE comprises a first UE; wherein the transmitting comprises transmitting, by the BS to the first UE having a normal or high mobility status, control information indicating resources allocated to the first user equipment for Idle mode uplink transmission within a first preconfigured uplink resource (PUR) subframe, the first preconfigured uplink resource (PUR) subframe including an extended cyclic prefix based on a normal mobility status or a high mobility status of the first UE; and the method further comprising transmitting, by the BS to a second UE having a low or stationary mobility status, control information indicating resources allocated to the second UE for Idle mode uplink transmission within a second preconfigured uplink resource (PUR) subframe, the second preconfigured uplink resource (PUR) subframe including a normal cyclic prefix, which is shorter than the extended cyclic prefix, based on a low or stationary mobility status of the second user equipment.

According to an example embodiment, the UE comprises a first UE that is served by a large cell, and a second UE is served by a small cell that is smaller than the large cell; wherein the transmitting comprises transmitting, by the BS to the first UE, control information indicating resources allocated to the first UE for Idle mode uplink transmission within a first preconfigured uplink resource (PUR) subframe, the first preconfigured uplink resource (PUR) subframe including an extended cyclic prefix based on the large cell that is serving the first UE; and the method further comprising transmitting, by the BS to the second UE, control information indicating resources allocated to the second UE for Idle mode uplink transmission within a second preconfigured uplink resource (PUR) subframe, the second preconfigured uplink resource (PUR) subframe including a normal cyclic prefix, which is shorter than the extended cyclic prefix, based on the small cell that is serving the second UE.

According to an example embodiment, the method may include determining, by the base station associated with the cell, at least one of a size of the cell or a mobility status of the UE; and, selecting the extended cyclic prefix, out of a plurality of cyclic prefix types or a plurality of cyclic prefix lengths, to be used for the preconfigured uplink resource (PUR) subframe for the UE based on at least one of a size of the cell, or the mobility status of the UE.

Figure 4:
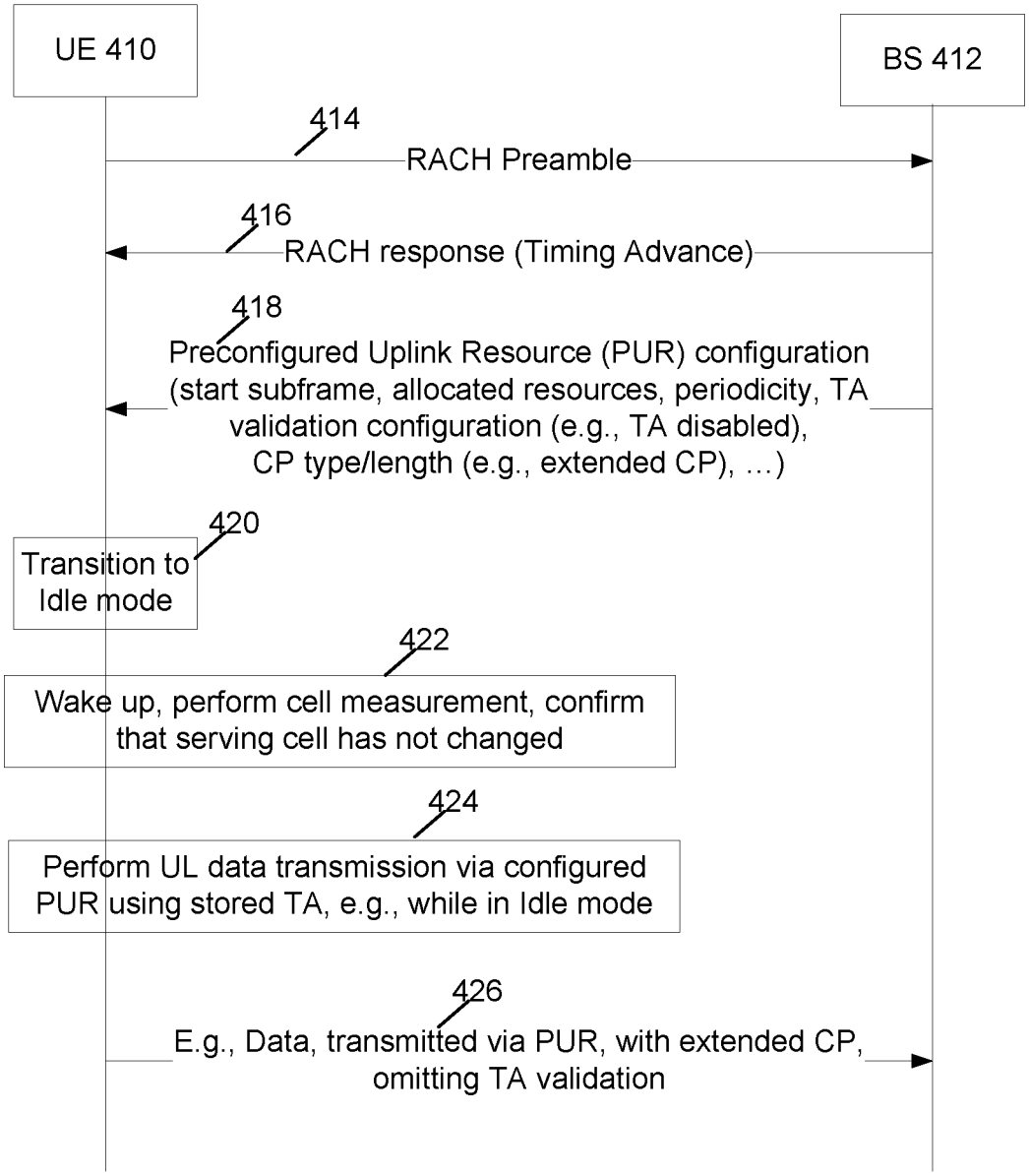
FIG. 4 is a diagram illustrating operation of a network according to an example embodiment.

FIG. 4 is a diagram illustrating operation of a network according to an example embodiment. A UE 410 may be in communication with a BS 412. For example, after initial cell search, the UE may establish a connection with the BS 412 via operations 414 and 416 (e.g., as part of a random access procedure). At 414, the UE sends a random access preamble to the BS 412. At 416, the BS sends a random access response to the UE 410, including at least a timing advance (TA) for the UE 410. Other steps part of a random access procedure may also be performed to establish a connection with BS 412 (e.g., not shown). At 418, e.g., while the UE 410 is still in connected mode with respect to the cell/BS, BS sends a PUR configuration to the UE 410, which may include, for example, information indicating the following: a start subframe, allocated time-frequency resources, a periodicity, set of valid cells (e.g., list of cell IDs), a CP type or CP length (e.g., normal CP or extended CP), and a TA validation configuration (e.g., including a TA validation criteria, an instruction to modify TA validation criteria parameters or thresholds, or an instruction to disable TA validation, . . . ). In this example, it is assumed that the PUR configuration indicates that TA validation should be omitted (disabled), and an extended CP should be used for this PUR that is assigned to the UE with respect to the cell/BS 412. At 420, the UE 410 transitions to Idle mode. The UE 410 may also move or change locations while in Idle mode. At 422, while still in Idle mode, the UE may wake up, perform cell measurements, and confirm (e.g., based on the cell measurements) that the serving cell for the UE has not changed (the Idle mode serving cell 412 for the UE is the same cell 412 that provided the TA and TA validation configuration). At 424, the UE 410 may then perform an uplink (UL) data transmission via the configured PUR using the stored TA, e.g., while the UE 410 is still in Idle mode. As an illustrative example, at 426, the UE 410 may transmit data via the configured PUR, using the extended CP, and omitting the TA validation (as instructed by the PUR configuration received from the same serving cell 412). This is merely an illustrative example, and other operations and features may be provided.

According to an example embodiment, a BS/eNB/gNB may configure one set of PUR subframes using extended CP and another set of PUR subframes using normal CP. For example, stationary UEs can be assigned PUR subframes with normal CP (as the normal CPs have higher efficiency), while mobile UEs can be assigned PUR subframes with extended CP (mobile UEs may need a longer CP, due to their higher mobility within the cell). A RRC configuration message may be sent by BS/eNB/gNB to UE to configure a subframe(s) as PUR subframe, with extended CP, and would only configure extended CP for these PUR subframes. Some UEs could be configured to have PUR SFs with only normal CP (e.g., stationary); and other UEs (non-stationary) with PUR SFs with extended CP. For other UEs, they need to know to skip this subframe, so the BS/eNB/gNB may transmit an invalid subframe bit in bitmap broadcast in SIB1, to inform other UEs not to transmit in this subframe. This may allow PUR subframes to be configured for a UE, while not allowing other UEs (e.g., legacy UEs), which may be unaware of PUR configuration, to know not to use that subframe, which has been configured for PUR.

For example, stationary UEs can be assigned PUR subframes with normal CP (as these have higher efficiency) while mobile UEs can be assigned PUR subframes with extended CP (e.g., a longer CP may be needed by higher mobility UEs). Thus, for example, a CP length or CP type for PUR subframe may be assigned to the PUR subframe based on mobility status of the UE (and also based on cell size). For example, the BS/eNB/gNB may be aware of subscription status of a UE (e.g., water meter UE), and thus knows the water meter UE is a stationary UE, and thus, a normal CP may be configured for PUR for that stationary UE.

In one embodiment, UEs that have been assigned PUR subframes with extended CP will skip (omit) the TA validation step (e.g., UE can be configured by the network to skip the TA validation step or be configured by the network that the TA will be determined as valid) and use a fixed TA value of 0 when transmitting, for example (or other TA value). For example, a single bit in the PUR configuration may be used to provide this indication (instruction to UE to skip or omit TA validation if it has the same serving cell). Or, the BS may set a threshold for RSRP change to infinity (or other high value), so that UE will (e.g., always) be below the threshold, and thus won't perform TA validation). The BS/eNB/gNB can also set time alignment timer to infinity or large number, so that TA validation would result in a valid TA.

According to an example embodiment, a maximum TA value ($TA_{max}$) is indicated in the PUR and $TA_{old}$ stored in memory (e.g., from connected mode serving cell), is less than $TA_{max}$, then TA validation is skipped. This may be used to identify UEs within a small cell (or cell sizes less than a threshold size). For example, even if UE moves within cell, the extended CP can still handle or accommodate this movement within the cell.

In another embodiment, UEs that have been assigned PUR subframes with extended CP will skip the TA validation step (e.g., UE can be configured by the network to skip the TA valid step or be configured by the network that the TA will be determined as always valid) and adjust its TA value to a new TA value ($TA_{new}$) by $TA_{new}=TA_{old}-\delta$ if $TA_{old} \leq TA_{threshold}$ when transmitting. For example, $TA_{old}$ is the TA value assigned by cell/BS during connected mode. If the UE moves closer to eNB, and uses old TA, it will cause interference with previous subframe (hence the decrease in TA by δ to prevent this); if the UE doesn't move, or moves away from the BS/eNB, the extended CP can accommodate that delay. This operation may be used to further the enhance the cell size. For instance, using CP of 16.7 us (extended CP length defined for LTE), the supportable cell size can be improved to ~2.5 km, for example.

Figure 5:
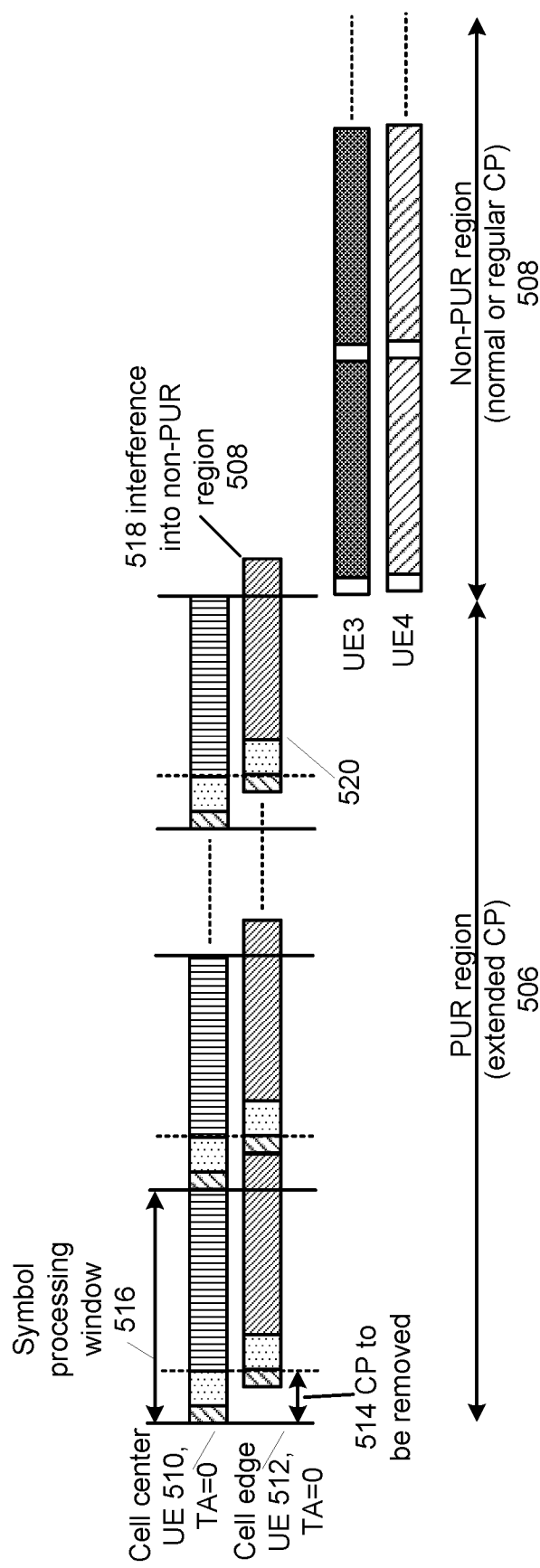
FIG. 5 is a diagram illustrating a transmission of data within a PUR region using an extended CP according to an example embodiment.

In another example embodiment, UEs that have been assigned PUR subframes with extended CP may skip transmitting the last SC-FDMA symbol in the PUR allocation or last PUR subframe. This may be used to prevent interference into non-PUR region using normal CP (as shown in FIG. 5). This can be configurable by the network.

FIG. 5 is a diagram illustrating a transmission of data within a PUR region (including a group of symbols) using an extended CP according to an example embodiment. A PUR region 506 of symbols is shown (with extended CP used for data transmission within PUR), and a non-PUR region 508 (with normal or regular CP used for transmission). In this example, a cell center UE 510 (located at or near center of the cell), and a cell-edge UE 512 (located at an edge of the cell) transmit data within the symbols of PUR region 506. Also, at 518, a portion of a last symbol 520 transmitted by cell center UE 512 extends into (and thus interferes with) a first symbol of non PUR region 508. Thus, for example, in this case, where the CP (e.g., extended CP) is not sufficient to account for the timing uncertainty of the (e.g., cell edge) UE (or in the absence of a CP), the UE may be configured to omit the transmission of a last symbol of the resources allocated to the UE within the configured PUR subframe. Also illustrated in FIG. 5 is a symbol processing window at the BS/eNB/gNB and how timing uncertainty can be accounted for by a portion of the CP. The key advantage of this technique (omitting transmission of last symbol allocated to UE within PUR subframe) is that it may allow even larger cell sizes to be used, while omitting TA validation. For example, combining the extended CP with the omitting transmission of the last symbol of PUR allocation) may allow PUR to be used without the need to perform TA validation on cell size of up to ~1.7-2.5 km (compared to ~0.1-0.2 km previously). This greatly increases the benefits of PUR (e.g., expanding the range or cell sizes where PUR may be used, while still allowing disabling or omission of TA validation, for example), resulting in lower latency for the UE and higher system efficiency for the network.

Further example details and examples will be briefly described.

According to an example embodiment, a BS/eNB/gNB may configure PUR subframes using extended cyclic prefix (CP) in order to increase the cell range where TA validation is not needed after the UE has confirmed that UE (e.g., in Idle mode) still has same serving cell as when PUR was configured. In one embodiment, BS/eNB/gNB configures PUR subframes using extended CP and non-PUR subframes using normal CP. The PUR subframes are marked as invalid subframes in SIB1 but are used by UEs configured to transmit on those subframes. BS/eNB/gNB may configure only subframes marked as invalid for PUR with extended CP. When a UE is configured with PUR in invalid subframes, the PUR configuration supersedes the valid subframe configuration—the UE determines that it can use the invalid subframes with an extended CP. When valid subframes are configured for PUR, the UE assumes normal CP for these subframes.

For example, if an extended CP is 16.7 μs while normal CP is 4.7 μs/5.2 μs, this means that if extended CP is used, this extended CP can support cell size of ~1.7 km without requiring TA validity check (the cell size is obtained as the distance for which the propagation delay is equal to half the margin provided by the CP). For NR-IoT, even longer extended CP value may be used to increase the supported cell range. Also see possible further cell range improvement step below. An extended CP is used to handle both channel delay profile and UE timing uncertainty. For instance, for extended CP of 16.7 μs, 5.7 μs of the CP may be allocated to handle channel delay profile, which leaves 11 μs to handle timing uncertainty. This timing uncertainty corresponds to a range of 1.65 km.

In one embodiment, eNB configures one set of PUR subframes using extended CP and another set of PUR subframes using normal CP. For example, stationary UEs can be assigned PUR subframes with normal CP (as these have higher efficiency) while mobile UEs can be assigned PUR subframes with extended CP.

In one embodiment, UEs that have been assigned PUR subframes with extended CP will skip the TA validation step (e.g. UE can be configured by the network to skip the TA valid step or be configured by the network that the TA is always valid) and use TA value of 0 (or other value) when transmitting based on one of the following: A single bit or field in the PUR configuration is used to provide this indication; or A parameter $TA_{max}$ is indicated in the PUR configuration and $TA_{old} \leq TA_{max}$ is satisfied where $TA_{old}$ is the initial TA value indicated by the eNB.

In another embodiment, UEs that have been assigned PUR subframes with extended CP will skip the TA validation step (e.g., UE can be configured by the network to skip the TA valid step or be configured by the network that the TA is always valid) and use TA value of $TA_{min}$ (where $TA_{min} > 0$) when transmitting.

In another embodiment, UEs that have been assigned PUR subframes with extended CP will skip the TA validation step (e.g. UE can be configured by the network to skip the TA valid step or be configured by the network that the TA is always valid) and adjust its TA value by $TA_{new} = TA_{old} - \delta$ if $\delta \leq TA_{old} \leq TA_{threshold}$ when transmitting. The parameters $TA_{threshold}$ and $\delta$ are indicated in the PUR configuration. The signal delay caused by reducing the TA value is absorbed by the CP. A proactive reduction of the TA value allows for movement of the UE closer to the eNB without causing interference resulting from use of the old TA value. The increased propagation delay caused by either lack of movement or movement away from the eNB is absorbed or accommodated by the CP. This step can be used to further the enhance the cell size. For instance, using CP of 16.7 us, the supportable cell size can be improved to ~2.5 km.

In another embodiment, UEs that have been assigned PUR subframes with extended CP will skip transmitting the last SC-FDMA symbol in the PUR allocation. This may be used to prevent interference into non-PUR region using regular CP (as shown in FIG. 5). This can be configurable by the network.

In an alternative embodiment, after the eNB has assigned PUR subframes with extended CP to a UE, the eNB adjusts the TA value for the UE by sending a TA command and indicates to the UE to skip the TA validation step. The indication to skip the TA validation step can be provided through MAC CE (media access control (MAC) control element) signaling. Reducing the TA value right after PUR configuration allows the UE to subsequently move closer to the eNB without causing interference. The increased propagation delay caused by either lack of movement or movement away from the eNB is absorbed by the CP.

In one embodiment, eNB monitors the timing of the received PUR subframes. The BS/eNB can use this information to switch the UEs assigned PUR subframes with extended CP to PUR subframes with normal CP (and vice versa). This switching could be accomplished via control signaling with a flag, potentially using just a single bit. This switching may be done if the UE is determined to no longer be mobile or is found to be remaining close to the eNB.

Switching to normal CP would improve the efficiency of the UE using PUR. When TA value of 0 (e.g., if UE is in a small cell) is used the timing of the received PUR subframes provides some rough distance information without the need to track TA closely or use exact timing estimation. For example, if the same or a very similar TA (or propagation delay) is measured or determined by a BS/eNB for a UE (or a variation or difference between two or multiple TAs is less than a threshold), then the BS may assume the UE has a very low mobility status (e.g., UE has little movement, as compared to size of the cell, and may even be stationary). As such, the BS/eNB may send control information for PUR subframes to change from extended CP to a normal CP. Thus, it can be seen that mobility status of a UE may be determined by a BS in a variety of ways, e.g., based on subscription information for the UE (e.g., indicating a stationary water meter UE), or by measured multiple TAs or propagation delays for RACH preamble, and then calculate a difference (or TA variation) between two or more TAs or propagation delays. Likewise, a UE initially configured for PUR with a normal CP, may later be configured for extended CP if the change or variation in TA or propagation delay is greater than a threshold.

Figure 6:
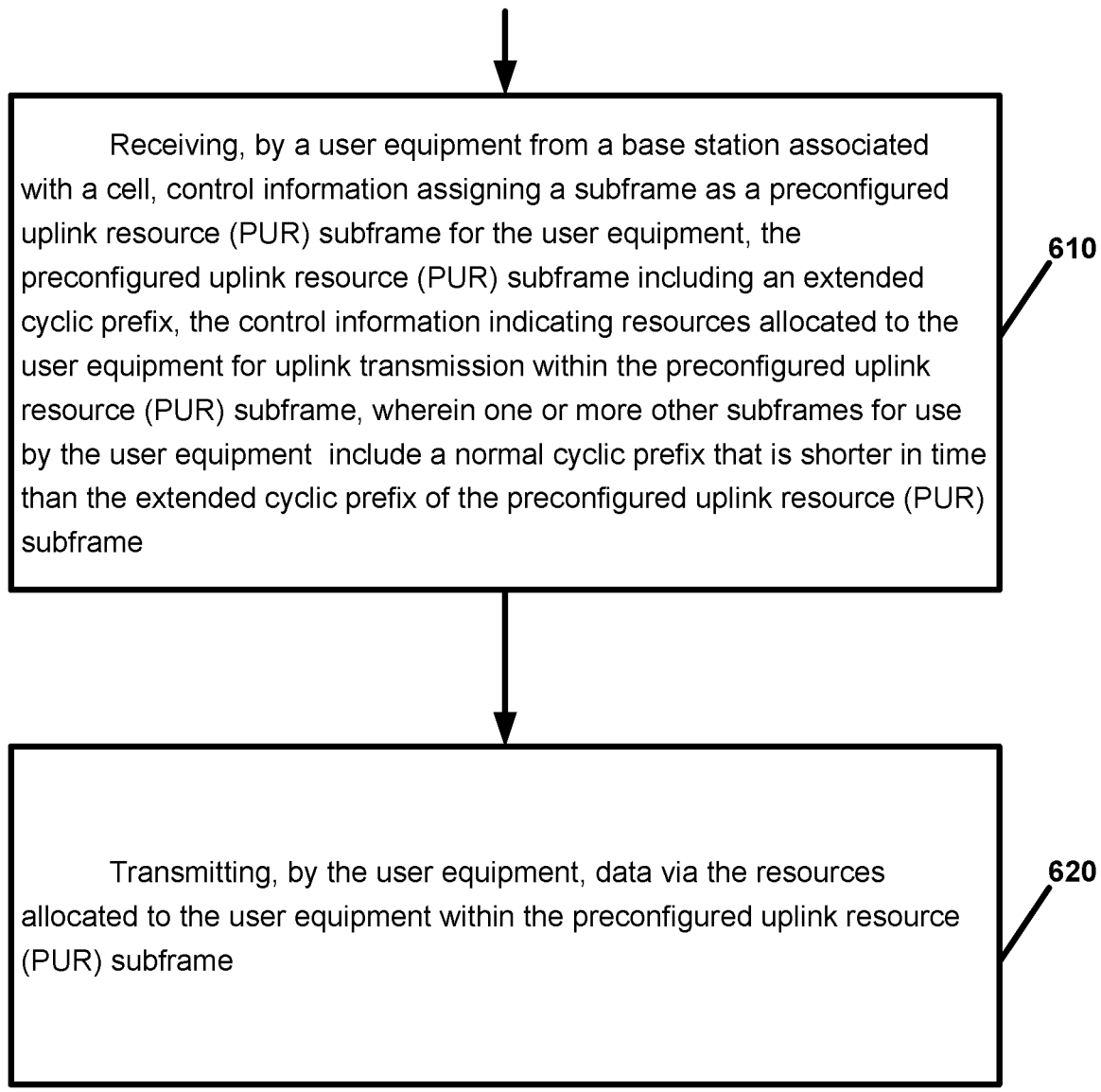
FIG. 6 is a flow chart illustrating operation of a user equipment according to an example embodiment.

Example 1. FIG. 6 is a flow chart illustrating operation of a user equipment according to an example embodiment. Operation 610 includes receiving, by a user equipment from a base station associated with a cell, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe. And, operation 620 includes transmitting, by the user equipment, data via the resources allocated to the user equipment within the preconfigured uplink resource (PUR) subframe.

Example 2. The method of Example 1 wherein the receiving comprises receiving, by the user equipment from the base station associated with a cell, control information assigning a plurality of subframes as preconfigured uplink resource (PUR) subframes for the user equipment, each of the preconfigured uplink resource (PUR) subframes including an extended cyclic prefix, the control information indicating resources allocated to the user equipment for uplink transmission within the plurality of preconfigured uplink resource (PUR) subframes, wherein one or more other subframes for use by the user equipment include a normal cyclic prefix that is shorter in time than the extended cyclic prefix of the preconfigured uplink resource (PUR) subframe; wherein the transmitting comprises transmitting, by the user equipment, data via the resources allocated to the user equipment within the plurality of preconfigured uplink resource (PUR) subframes.

Example 3. The method of any of Examples 1-2, further comprising: receiving, by the user equipment from the base station with respect to the cell, a timing advance while the user equipment is in a connected mode or as part of a random access procedure with respect to the cell.

Example 4. The method of any of claims 2-3, further comprising: transitioning, by the user equipment, to an Idle mode with respect to the cell; wherein the transmitting comprises: transmitting, by the user equipment while in Idle mode with respect to the cell, data via the resources allocated to the user equipment within the preconfigured uplink resource (PUR) subframe.

Example 5. The method of any of Examples 1-4 wherein the control information further comprises: control information indicating that a timing advance validation for the user equipment with respect to the cell has been disabled, or should be omitted, for the preconfigured uplink resource (PUR) subframe.

Example 6. The method of Example 5, wherein the transmitting comprises: transmitting, by the user equipment, data via the resources allocated to the user equipment within the preconfigured uplink resource (PUR) subframe, without performing a timing advance validation.

Example 7. The method of Example 3, wherein the receiving control information further comprises receiving control information indicating one or more parameters of a timing advance validation criteria, such that the timing advance will be determined as valid when the cell, which provided the timing advance, is still a serving cell for the user equipment when a timing advance validation is performed by the user equipment.

Example 8. The method of any of Examples 1-7, further comprising: receiving, by the user equipment: a timing advance command instructing the user equipment to adjust the timing advance to an adjusted timing advance for the user equipment with respect to the cell; and control information instructing the user equipment to use the adjusted timing advance for transmission timing for the preconfigured uplink resource (PUR) subframe while omitting the timing advance validation.

Example 9. The method of any of Examples 1-8, wherein the transmitting data comprises: transmitting, by the user equipment while in an Idle mode, data via the resources allocated to the user equipment within the preconfigured uplink resource (PUR) subframe, while omitting a transmission of a last symbol of the resources allocated to the user equipment within the preconfigured uplink resource (PUR) subframe.

Example 10. The method of any of Examples 1-9, wherein the receiving comprises: receiving, by the user equipment from the base station, control information indicating that the preconfigured uplink resource (PUR) subframe, which has been assigned to the user equipment for uplink transmission, is marked as invalid for use with respect to other user equipments.

Example 11. The method of any of Examples 1-10, wherein the transmitting is performed by the user equipment using a new timing advance ($TA_{new}$) based on at least one of the following: $TA_{new}=0$, or zero timing advance, when either: 1) a bit or flag in the control information for the preconfigured uplink resource (PUR) subframe provides this indication, or when $TA_{old} \leq TA_{max}$ is satisfied where $TA_{old}$ is an initial timing advance value indicated by the control information and $TA_{max}$ is a parameter provided in the control information for the preconfigured uplink resource (PUR) subframe; or $TA_{new}=TA_{old}-\delta$ if $TA_{old} \leq TA_{threshold}$, where $TA_{old}$ is an initial timing advance value indicated by the control information and $TA_{threshold}$ and $\delta$ are provided in the control information.

Example 12. The method of any of Examples 1-11, wherein the receiving comprises: receiving, by the user equipment from the base station associated with the cell, control information assigning a subframe as a preconfigured uplink resource (PUR) subframe for the user equipment with respect to the cell, the preconfigured uplink resource (PUR)

subframe including a cyclic prefix having a cyclic prefix length based on at least one of a size of the cell, or a mobility status of the user equipment.

Example 13. The method of any of Examples 1-12, wherein the receiving control information further comprises: receiving control information indicating a length of the cyclic prefix, or a cyclic prefix type, for the preconfigured uplink resource (PUR) subframe.

Example 14. The method of any of Examples 1-13, wherein the extended cyclic prefix, out of a plurality of cyclic prefix types or a plurality of cyclic prefix lengths, is configured for the preconfigured uplink resource (PUR) subframe based on at least one of a size of the cell, or a mobility status of the user equipment.

Example 15. The method of Example 14, wherein the mobility status of the user equipment is one of the following: a low mobility status or stationary mobility status; or a normal mobility status.

Example 16. The method of any of Examples 1-15, wherein the transmitting is performed by the user equipment while the user equipment is in Idle mode.

Example 17. The method of any of Examples 1-15, wherein the transmitting is performed by the user equipment while the user equipment is in Inactive mode.

Example 18. An apparatus comprising means for performing the method of any of Examples 1-17.

Example 19. A non-transitory computer-readable storage medium comprising instructions stored thereon that, when executed by at least one processor, are configured to cause a computing system to perform the method of any of Examples 1-17.

Example 20. An apparatus comprising: at least one processor; and at least one memory including computer program code; the at least one memory and the computer program code configured to, with the at least one processor, cause the apparatus at least to perform the method of any of Examples 1-17.

Example 21. An apparatus comprising: at least one processor; and at least one memory including computer program code; the at least one memory and the computer program code configured to, with the at least one processor, cause the apparatus to: receive, by a user equipment from a base station associated with a cell, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and transmit, by the user equipment, data via the resources allocated to the user equipment within the preconfigured uplink resource (PUR) subframe.

Figure 7:
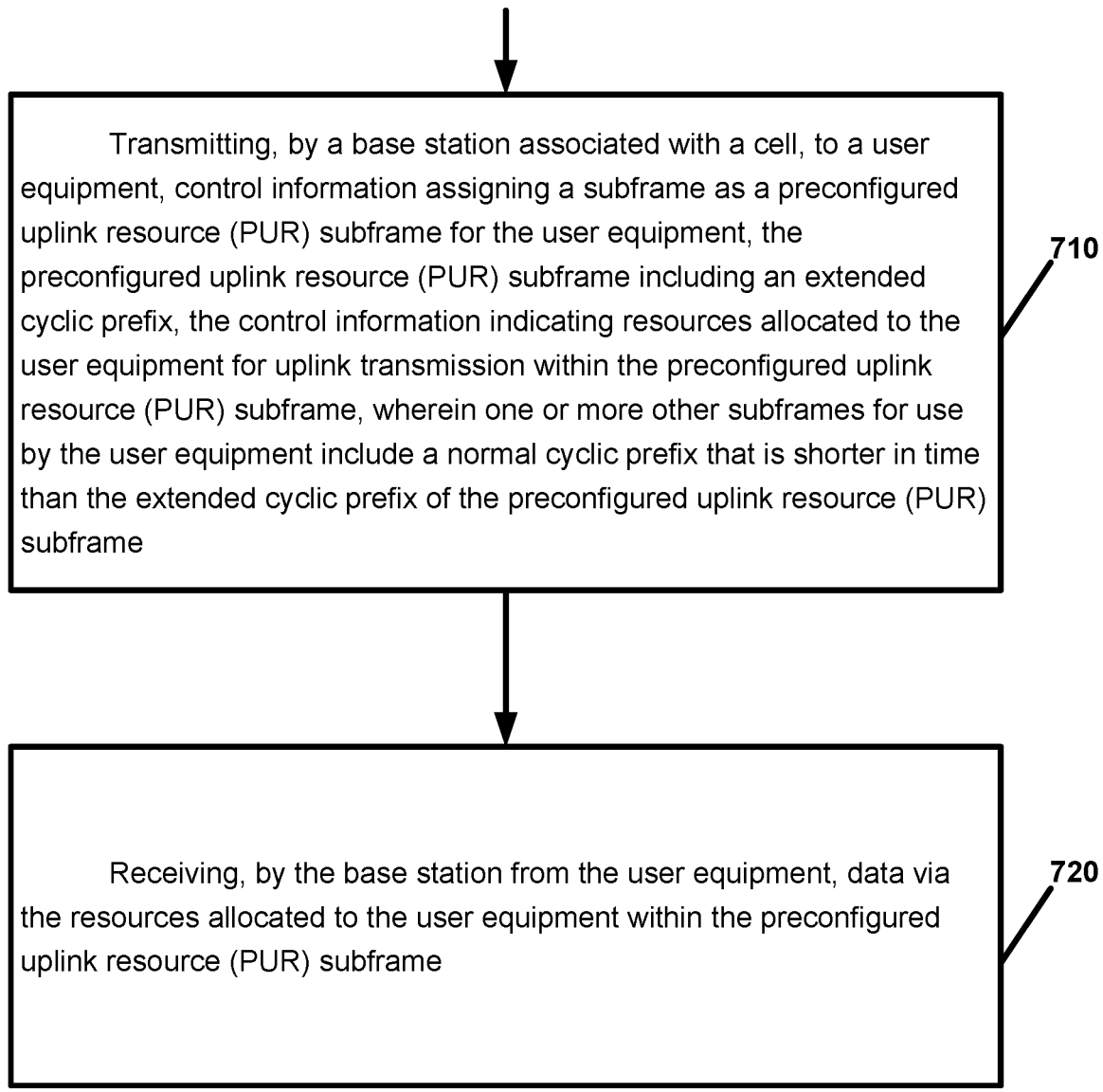
FIG. 7 is a flow chart illustrating operation of a base station according to an example embodiment.

Example 22. FIG. 7 is a flow chart illustrating operation of a base station according to an example embodiment. Operation 710 includes transmitting, by a base station associated with a cell, to a user equipment, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe. Operation 720 includes receiving, by the base station from the user equipment, data via the resources allocated to the user equipment within the preconfigured uplink resource (PUR) subframe.

Example 23. The method of Example 22: wherein the transmitting comprises transmitting, by the base station to the user equipment, control information assigning a plurality of subframes as preconfigured uplink resource (PUR) subframes for the user equipment, each of the preconfigured uplink resource (PUR) subframes including an extended cyclic prefix, the control information indicating resources allocated to the user equipment for uplink transmission within the plurality of preconfigured uplink resource (PUR) subframes, wherein one or more other subframes for use by the user equipment include a normal cyclic prefix that is shorter in time than the extended cyclic prefix of the preconfigured uplink resource (PUR) subframe; and wherein the receiving comprises receiving, by the base station, data via the resources allocated to the user equipment within the plurality of preconfigured uplink resource (PUR) subframes.

Example 24. The method of any of Examples 22-23, wherein the transmitting control information further comprises: transmitting control information indicating that a timing advance validation for the user equipment with respect to the cell has been disabled, or should be omitted, for the preconfigured uplink resource (PUR) subframe.

Example 25. The method of any of Examples 22-24, wherein the transmitting comprises: transmitting, by a base station associated with a cell, to a user equipment, control information assigning a plurality of subframes as preconfigured uplink resource (PUR) subframes for the user equipment with respect to the cell, each of the preconfigured uplink resource (PUR) subframes including an extended cyclic prefix; wherein the transmitting control information further comprises: transmitting control information indicating that a timing advance validation for the user equipment with respect to the cell has been disabled, or should be omitted, for a subset of the preconfigured uplink resource (PUR) subframes.

Example 26. The method of any of Examples 22-25, wherein the receiving data comprises: receiving, by the base station from the user equipment, data via the resources allocated to the user equipment within the preconfigured uplink resource (PUR) subframe, in which a timing advance validation has been omitted.

Example 27. The method of any of Examples 22-26, wherein the transmitting control information further comprises: transmitting, by the base station to the user equipment, control information indicating one or more parameters of a timing advance validation criteria, such that the timing advance will be determined as valid when the cell, which provided the timing advance, is still a serving cell for the user equipment when a timing advance validation is performed by the user equipment Example 28. The method of any of Examples 22-27, further comprising: transmitting, by the base station to the user equipment: a timing advance command instructing the user equipment to adjust the timing advance to an adjusted timing advance for the user equipment with respect to the cell; and control information instructing the user equipment to use the adjusted timing advance for transmission timing for the preconfigured uplink resource (PUR) subframe while omitting a timing advance validation.

Example 29. The method of Example 22, further comprising: determining, by the base station, at least one of the following: that the user equipment has a low mobility status or is stationary; or that the cell is a small cell having a size that is less than a threshold; and transmitting, by the base station to the user equipment, at least one of: 1) information indicating that a timing advance validation for the user equipment with respect to the cell has been disabled or should be omitted by the user equipment for the preconfigured uplink resource (PUR) subframe, or 2) one or more parameters of a timing advance validation criteria, such that the timing advance will be determined by the user equipment as valid for the preconfigured uplink resource (PUR) subframe when the cell, which provided the timing advance, is still a serving cell for the user equipment when a timing advance validation is performed by the user equipment.

Example 30. The method of Example 22, wherein the user equipment comprises a first user equipment; wherein the transmitting comprises transmitting, by the base station to the first user equipment having a normal or high mobility status, control information indicating resources allocated to the first user equipment for Idle mode uplink transmission within a first preconfigured uplink resource (PUR) subframe, the first preconfigured uplink resource (PUR) subframe including an extended cyclic prefix based on a normal mobility status or a high mobility status of the first user equipment; and the method further comprising transmitting, by the base station to a second user equipment having a low or stationary mobility status, control information indicating resources allocated to the second user equipment for Idle mode uplink transmission within a second preconfigured uplink resource (PUR) subframe, the second preconfigured uplink resource (PUR) subframe including a normal cyclic prefix, which is shorter than the extended cyclic prefix, based on a low or stationary mobility status of the second user equipment.

Example 31. The method of any of Examples 22-30, further comprising: determining by the base station associated with the cell, at least one of a size of the cell or a mobility status of the user equipment; and selecting the extended cyclic prefix, out of a plurality of cyclic prefix types or a plurality of cyclic prefix lengths, to be used for the preconfigured uplink resource (PUR) subframe based on at least one of a size of the cell, or the mobility status of the user equipment.

Example 32. The method of any of Examples 22-31 wherein the receiving by the base station is performed while the user equipment is in an Idle mode.

Example 33. The method of any of Examples 22-31 wherein the receiving by the base station is performed while the user equipment is in an Inactive mode.

Example 34. An apparatus comprising means for performing the method of any of Examples 22-33.

Example 35. A non-transitory computer-readable storage medium comprising instructions stored thereon that, when executed by at least one processor, are configured to cause a computing system to perform the method of any of Examples 22-33.

Example 36. An apparatus comprising: at least one processor; and at least one memory including computer program code; the at least one memory and the computer program code configured to, with the at least one processor, cause the apparatus at least to perform the method of any of Examples 22-33.

Example 37. An apparatus comprising: at least one processor; and at least one memory including computer program code; the at least one memory and the computer program code configured to, with the at least one processor, cause the apparatus to: transmit, by a base station associated with a cell, to a user equipment, control information assigning a subframe as a preconfigured uplink resource (PUR) subframe for the user equipment, the preconfigured uplink resource (PUR) subframe including an extended cyclic prefix, the control information indicating resources allocated to the user equipment for uplink transmission within the preconfigured uplink resource (PUR) subframe, wherein one or more other subframes for use by the user equipment include a normal cyclic prefix that is shorter in time than the extended cyclic prefix of the preconfigured uplink resource (PUR) subframe; and receive, by the base station from the user equipment, data via the resources allocated to the user equipment within the preconfigured uplink resource (PUR) subframe.

Example 38. The apparatus of Example 37: wherein being configured to cause the apparatus to transmit comprises being configured to cause the apparatus to transmit, by the base station to the user equipment, control information assigning a plurality of subframes as preconfigured uplink resource (PUR) subframes for the user equipment, each of the preconfigured uplink resource (PUR) subframes including an extended cyclic prefix, the control information indicating resources allocated to the user equipment for uplink transmission within the plurality of preconfigured uplink resource (PUR) subframes, wherein one or more other subframes for use by the user equipment include a normal cyclic prefix that is shorter in time than the extended cyclic prefix of the preconfigured uplink resource (PUR) subframe; and wherein the receiving comprises receiving, by the base station, data via the resources allocated to the user equipment within the plurality of preconfigured uplink resource (PUR) subframes.

Example 39. The apparatus of any of Examples 37-38, wherein being configured to cause the apparatus to transmit control information further comprises being configured to cause the apparatus to: transmit control information indicating that a timing advance validation for the user equipment with respect to the cell has been disabled, or should be omitted, for the preconfigured uplink resource (PUR) subframe.

Example 40. The apparatus of any of Examples 37-39, wherein being configured to cause the apparatus to transmit comprises being configured to cause the apparatus to: transmit, by a base station associated with a cell, to a user equipment, control information assigning a plurality of subframes as preconfigured uplink resource (PUR) subframes for the user equipment with respect to the cell, each of the preconfigured uplink resource (PUR) subframes including an extended cyclic prefix; wherein being configured to cause the apparatus to transmit comprises being further configured to cause the apparatus to: transmit a control information indicating that a timing advance validation for the user equipment with respect to the cell has been disabled, or should be omitted, for a subset of the preconfigured uplink resource (PUR) subframes.

Example 41. The apparatus of any of Examples 37-40, wherein being configured to cause the apparatus to receive data comprises being configured to cause the apparatus to: receive, by the base station from the user equipment, data via the resources allocated to the user equipment within the preconfigured uplink resource (PUR) subframe, in which a timing advance validation has been omitted.

Example 42. The apparatus of any of Examples 37-41, wherein being configured to cause the apparatus to transmit control information further comprises being configured to cause the apparatus to: transmit, by the base station to the user equipment, control information indicating one or more parameters of a timing advance validation criteria, such that the timing advance will be determined as valid when the cell, which provided the timing advance, is still a serving cell for the user equipment when a timing advance validation is performed by the user equipment Example 43. The apparatus of any of Examples 37-42, being configured to further cause the apparatus to: transmit, by the base station to the user equipment: a timing advance command instructing the user equipment to adjust the timing advance to an adjusted timing advance for the user equipment with respect to the cell; and control information instructing the user equipment to use the adjusted timing advance for transmission timing for the preconfigured uplink resource (PUR) subframe while omitting a timing advance validation.

Example 44. The apparatus of Example 37, further being configured to cause the apparatus to: determine, by the base station, at least one of the following: that the user equipment has a low mobility status or is stationary; or that the cell is a small cell having a size that is less than a threshold; and transmitting, by the base station to the user equipment, at least one of: 1) information indicating that a timing advance validation for the user equipment with respect to the cell has been disabled or should be omitted by the user equipment for the preconfigured uplink resource (PUR) subframe, or 2) one or more parameters of a timing advance validation criteria, such that the timing advance will be determined by the user equipment as valid for the preconfigured uplink resource (PUR) subframe when the cell, which provided the timing advance, is still a serving cell for the user equipment when a timing advance validation is performed by the user equipment.

Example 45. The apparatus of Example 37, wherein the user equipment comprises a first user equipment; wherein being configured to cause the apparatus to transmit comprises being configured to cause the apparatus to transmit, by the base station to the first user equipment having a normal or high mobility status, control information indicating resources allocated to the first user equipment for Idle mode uplink transmission within a first preconfigured uplink resource (PUR) subframe, the first preconfigured uplink resource (PUR) subframe including an extended cyclic prefix based on a normal mobility status or a high mobility status of the first user equipment; and being further configured to cause the apparatus to transmit, by the base station to a second user equipment having a low or stationary mobility status, control information indicating resources allocated to the second user equipment for Idle mode uplink transmission within a second preconfigured uplink resource (PUR) subframe, the second preconfigured uplink resource (PUR) subframe including a normal cyclic prefix, which is shorter than the extended cyclic prefix, based on a low or stationary mobility status of the second user equipment.

Example 46. The apparatus of any of Examples 37-45, being configured to further cause the apparatus to: determine by the base station associated with the cell, at least one of a size of the cell or a mobility status of the user equipment; and select the extended cyclic prefix, out of a plurality of cyclic prefix types or a plurality of cyclic prefix lengths, to be used for the preconfigured uplink resource (PUR) subframe based on at least one of a size of the cell, or the mobility status of the user equipment.

Example 47. The apparatus of any of Examples 37-46 wherein being configured to cause the apparatus to receive comprises being configured to cause the apparatus to receive, by the base station, while the user equipment is in an Idle mode.

Example 48. The apparatus of any of Examples 37-47 wherein being configured to cause the apparatus to receive comprises being configured to cause the apparatus to receive, by the base station, while the user equipment is in an Inactive mode.

Example 49. The apparatus of Example 21 wherein being configured to cause the apparatus to receive comprises being configured to cause the apparatus to receive, by the user equipment from the base station associated with a cell, control information assigning a plurality of subframes as preconfigured uplink resource (PUR) subframes for the user equipment, each of the preconfigured uplink resource (PUR) subframes including an extended cyclic prefix, the control information indicating resources allocated to the user equipment for uplink transmission within the plurality of preconfigured uplink resource (PUR) subframes, wherein one or more other subframes for use by the user equipment include a normal cyclic prefix that is shorter in time than the extended cyclic prefix of the preconfigured uplink resource (PUR) subframe; wherein being configured to cause the apparatus to transmit comprises being configured to cause the apparatus to transmit, by the user equipment, data via the resources allocated to the user equipment within the plurality of preconfigured uplink resource (PUR) subframes.

Example 50. The apparatus of any of Examples 21 and 49, further comprising being configured to cause the apparatus to: receive, by the user equipment from the base station with respect to the cell, a timing advance while the user equipment is in a connected mode or as part of a random access procedure with respect to the cell.

Example 51. The apparatus of any of claims 49-50, further comprising being configured to cause the apparatus to: transition, by the user equipment, to an Idle mode with respect to the cell; wherein being configured to cause the apparatus to transmit comprises being configured to cause the apparatus to: transmit, by the user equipment while in Idle mode with respect to the cell, data via the resources allocated to the user equipment within the preconfigured uplink resource (PUR) subframe.

Example 52. The apparatus of any of Examples 21 and 49-51 wherein the control information further comprises: control information indicating that a timing advance validation for the user equipment with respect to the cell has been disabled, or should be omitted, for the preconfigured uplink resource (PUR) subframe.

Example 53. The apparatus of Example 52, wherein being configured to cause the apparatus to transmit comprises being configured to cause the apparatus to: transmit, by the user equipment, data via the resources allocated to the user equipment within the preconfigured uplink resource (PUR) subframe, without performing a timing advance validation.

Example 54. The apparatus of Example 50, wherein being configured to cause the apparatus to receive the control information comprises being configured to cause the apparatus to receive control information indicating one or more parameters of a timing advance validation criteria, such that the timing advance will be determined as valid when the cell, which provided the timing advance, is still a serving cell for the user equipment when a timing advance validation is performed by the user equipment.

Example 55. The apparatus of any of Examples 21 and 49-54, further comprising being configured to cause the apparatus to: receive, by the user equipment: a timing advance command instructing the user equipment to adjust the timing advance to an adjusted timing advance for the user equipment with respect to the cell; and control information instructing the user equipment to use the adjusted timing advance for transmission timing for the preconfigured uplink resource (PUR) subframe while omitting the timing advance validation.

Example 56. The apparatus of any of Examples 21 and 49-55, wherein being configured to cause the apparatus to transmit data comprises being configured to cause the apparatus to: transmit, by the user equipment while in an Idle mode, data via the resources allocated to the user equipment within the preconfigured uplink resource (PUR) subframe, while omitting a transmission of a last symbol of the resources allocated to the user equipment within the preconfigured uplink resource (PUR) subframe.

Example 57. The apparatus of any of Examples 21 and 49-56, wherein being configured to cause the apparatus to receive comprises being configured to cause the apparatus to receive, by the user equipment from the base station, control information indicating that the preconfigured uplink resource (PUR) subframe, which has been assigned to the user equipment for uplink transmission, is marked as invalid for use with respect to other user equipments.

Example 58. The apparatus of any of Examples 21 and 49-57, wherein being configured to cause the apparatus to transmit comprises being configured to cause the apparatus to transmit, by the user equipment using a new timing advance (TAnew) based on at least one of the following: TAnew=0, or zero timing advance, when either: 1) a bit or flag in the control information for the preconfigured uplink resource (PUR) subframe provides this indication, or when TAold≤TAmax is satisfied where TAold is an initial timing advance value indicated by the control information and TAmax is a parameter provided in the control information for the preconfigured uplink resource (PUR) subframe; or TAnew=TAold−δ if TAold≤TAthreshold, where TAold is an initial timing advance value indicated by the control information and $TA_{threshold}$ and δ are provided in the control information.

Example 59. The apparatus of any of Examples 21 and 49-58, wherein being configured to cause the apparatus to receive comprises being configured to cause the apparatus to receive, by the user equipment from the base station associated with the cell, control information assigning a subframe as a preconfigured uplink resource (PUR) subframe for the user equipment with respect to the cell, the preconfigured uplink resource (PUR) subframe including a cyclic prefix having a cyclic prefix length based on at least one of a size of the cell, or a mobility status of the user equipment.

Example 60. The apparatus of any of Examples 21 and 49-59, wherein being configured to cause the apparatus to receive control information further comprises being configured to cause the apparatus to: receive control information indicating a length of the cyclic prefix, or a cyclic prefix type, for the preconfigured uplink resource (PUR) subframe.

Example 61. The apparatus of any of Examples 21 and 49-60, wherein the extended cyclic prefix, out of a plurality of cyclic prefix types or a plurality of cyclic prefix lengths, is configured for the preconfigured uplink resource (PUR) subframe based on at least one of a size of the cell, or a mobility status of the user equipment.

Example 62. The apparatus of Example 61, wherein the mobility status of the user equipment is one of the following: a low mobility status or stationary mobility status; or a normal mobility status.

Example 63. The apparatus of any of Examples 21 and 49-62, wherein being configured to cause the apparatus to transmit comprises being configured to cause the apparatus to transmit, by the user equipment while the user equipment is in Idle mode.

Example 64. The apparatus of any of Examples 21 and 49-62, wherein being configured to cause the apparatus to transmit comprises being configured to cause the apparatus to transmit, by the user equipment while the user equipment is in Inactive mode.

Figure 8:
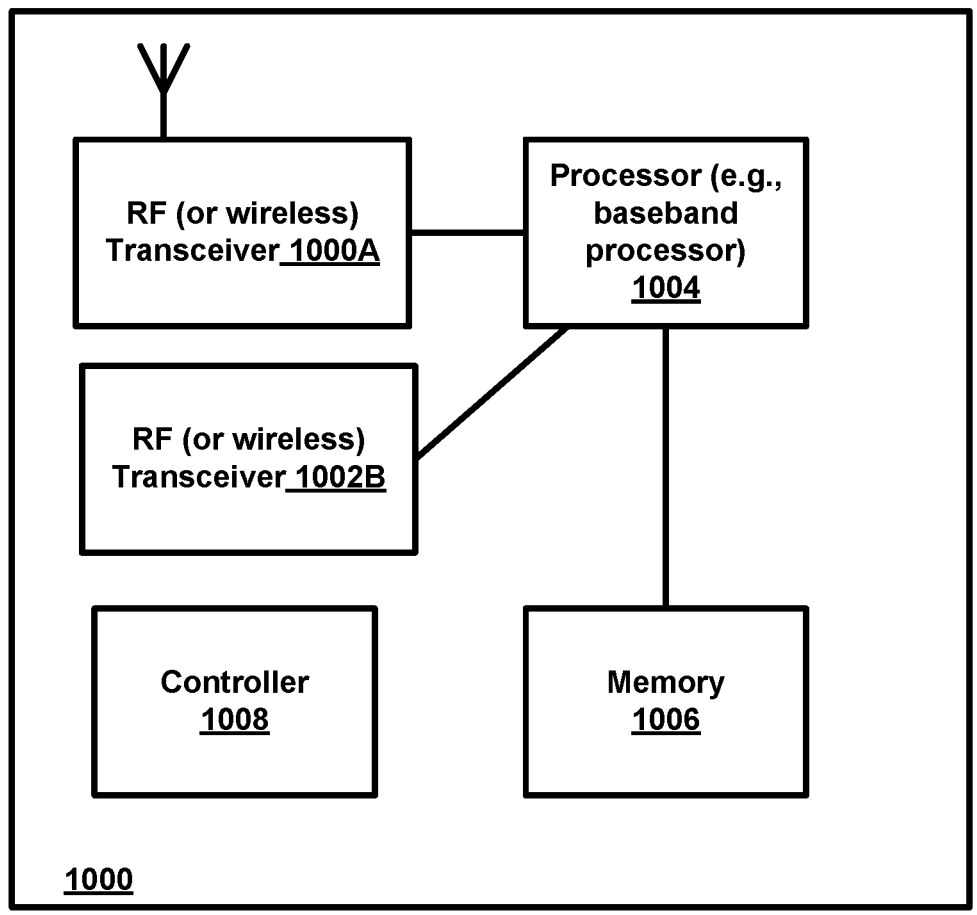
FIG. 8 is a block diagram of a wireless station (e.g., AP, BS, RAN node, UE or user device, or other network node) according to an example embodiment.

FIG. 8 is a block diagram of a wireless station (e.g., AP, BS or user device/UE, or other network node) 1000 according to an example embodiment. The wireless station 1000 may include, for example, one or more (e.g., two as shown in FIG. 8) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 8, a controller (or processor) 1008 may execute software and instructions, and may provide overall control for the station 1000, and may provide control for other systems not shown in FIG. 8, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    receiving, by a user equipment from a base station associated with a cell, control information assigning a subframe as a preconfigured uplink resource subframe for the user equipment, the preconfigured uplink resource subframe including an extended cyclic prefix, the control information indicating resources allocated to the user equipment for uplink transmission within the preconfigured uplink resource subframe, wherein one or more other subframes for use by the user equipment include a normal cyclic prefix that is shorter in time than the extended cyclic prefix of the preconfigured uplink resource subframe;
    transmitting, by the user equipment, data via the resources allocated to the user equipment within the preconfigured uplink resource subframe; and
    omitting a timing advance validation,
    wherein the transmitting data comprises:
    transmitting, by the user equipment while in an idle mode, data via the resources allocated to the user equipment within the preconfigured uplink resource subframe, while omitting a transmission of a last symbol of the resources allocated to the user equipment within the preconfigured uplink resource subframe.

2. The method of claim 1, wherein the control information further comprises at least one of:
    control information indicating that a timing advance validation for the user equipment with respect to the cell has been disabled, or should be omitted, for the preconfigured uplink resource subframe;
    control information indicating one or more parameters of a timing advance validation criteria, such that the timing advance will be determined as valid when the cell, which provided the timing advance, is still a serving cell for the user equipment when a timing advance validation is performed by the user equipment;
    control information indicating that the preconfigured uplink resource subframe is marked as invalid for use with respect to other user equipments;
    control information indicating a length of the cyclic prefix, or a cyclic prefix type, for the preconfigured uplink resource subframe.

3. The method of claim 1, further comprising:
    receiving, by the user equipment:
    a timing advance command instructing the user equipment to adjust the timing advance to an adjusted timing advance for the user equipment with respect to the cell, and
    control information instructing the user equipment to use the adjusted timing advance for transmission timing for the preconfigured uplink resource subframe while omitting the timing advance validation.

4. The method of claim 1, wherein the transmitting is performed by the user equipment using a new timing advance ($TA_{new}$) based on at least one of the following:
    $TA_{new}=0$, or zero timing advance, when either: 1) a bit or flag in the control information for the preconfigured uplink resource subframe provides this indication, or when $TA_{old} \leq TA_{max}$ is satisfied where $TA_{old}$ is an initial timing advance value indicated by the control information and $TA_{max}$ is a parameter provided in the control information for the preconfigured uplink resource subframe; or
    $TA_{new}=TA_{old}-\delta$ if $TA_{old}<TA_{threshold}$, where $TA_{old}$ is an initial timing advance value indicated by the control information and $TA_{threshold}$ and $\delta$ are provided in the control information.

5. The method of claim 1, wherein the extended cyclic prefix, out of a plurality of cyclic prefix types or a plurality of cyclic prefix lengths, is configured for the preconfigured uplink resource subframe based on at least one of a size of the cell, or a mobility status of the user equipment, and wherein the mobility status of the user equipment is one of the following:
    a low mobility status or stationary mobility status; and
    a normal mobility status or a high mobility status.

6. An apparatus, comprising:
    at least one processor; and
    at least one memory including computer program code;
    the at least one memory and the computer program code configured to, with the at least one processor, cause the apparatus to:
    receive from a base station associated with a cell, control information assigning a subframe as a preconfigured uplink resource subframe for the apparatus, the preconfigured uplink resource subframe including an extended cyclic prefix, the control information indicating resources allocated to the apparatus for uplink transmission within the preconfigured uplink resource subframe, wherein one or more other subframes for use by the apparatus include a normal cyclic prefix that is shorter in time than the extended cyclic prefix of the preconfigured uplink resource subframe;
    transmit data via the resources allocated to the apparatus within the preconfigured uplink resource subframe; and
    omit a timing advance validation,
    wherein the extended cyclic prefix, out of a plurality of cyclic prefix types or a plurality of cyclic prefix lengths, is configured for the preconfigured uplink resource subframe based on at least one of a size of the cell, or a mobility status of the apparatus, and wherein the mobility status of the apparatus is one of the following:
    a low mobility status or stationary mobility status; and
    a normal mobility status or a high mobility status.

7. The apparatus of claim 6, wherein the at least one memory and the computer program code configured to, with the at least one processor, cause the apparatus to:
    receive from the base station with respect to the cell, a timing advance while the apparatus is in a connected mode or as part of a random access procedure with respect to the cell.

8. The apparatus of claim 6, wherein the at least one memory and the computer program code configured to, with the at least one processor, cause the apparatus to:
    transition to an Idle mode with respect to the cell;
    wherein when transmitting, the at least one memory and the computer program code configured to, with the at least one processor, cause the apparatus to:
    transmit while in Idle mode with respect to the cell, data via the resources allocated to the apparatus within the preconfigured uplink resource subframe.

9. The apparatus of claim 6, wherein the control information further comprises at least one of:
   control information indicating that a timing advance validation for the apparatus with respect to the cell has been disabled, or should be omitted, for the preconfigured uplink resource subframe;
   control information indicating one or more parameters of a timing advance validation criteria, such that the timing advance will be determined as valid when the cell, which provided the timing advance, is still a serving cell for the apparatus when a timing advance validation is performed by the apparatus;
   control information indicating that the preconfigured uplink resource subframe is marked as invalid for use with respect to other user equipments;
   control information indicating a length of the cyclic prefix, or a cyclic prefix type, for the preconfigured uplink resource subframe.

10. The apparatus of claim 6, wherein the at least one memory and the computer program code configured to, with the at least one processor, cause the apparatus to:
   receive a timing advance command instructing the apparatus to adjust the timing advance to an adjusted timing advance for the apparatus with respect to the cell, and control information instructing the apparatus to use the adjusted timing advance for transmission timing for the preconfigured uplink resource subframe while omitting the timing advance validation.

11. The apparatus of claim 6, wherein when transmitting data, the at least one memory and the computer program code configured to, with the at least one processor, cause the apparatus to: transmit while in an idle mode, data via the resources allocated to the apparatus within the preconfigured uplink resource subframe, while omitting a transmission of a last symbol of the resources allocated to the apparatus within the preconfigured uplink resource subframe.

12. The apparatus of claim 6, wherein when transmitting, the at least one memory and the computer program code configured to, with the at least one processor, cause the apparatus to:
   use a new timing advance ($TA_{new}$) based on at least one of the following:
   $TA_{new}=0$, or zero timing advance, when either: 1) a bit or flag in the control information for the preconfigured uplink resource subframe provides this indication, or when $TA_{old} \leq TA_{max}$ is satisfied where $TA_{old}$ is an initial timing advance value indicated by the control information and $TA_{max}$ is a parameter provided in the control information for the preconfigured uplink resource subframe; or
   $TA_{new}=TA_{old}-\delta$ if $TA_{old} \leq TA_{threshold}$, where $TA_{old}$ is an initial timing advance value indicated by the control information and $TA_{threshold}$ and $\delta$ are provided in the control information.

13. An apparatus, comprising:
   at least one processor; and
   at least one memory including computer program code;
   the at least one memory and the computer program code configured to, with the at least one processor, cause the apparatus to:
      transmit by the apparatus associated with a cell, to a user equipment, control information assigning a subframe as a preconfigured uplink resource subframe for the user equipment, the preconfigured uplink resource subframe including an extended cyclic prefix, the control information indicating resources allocated to the user equipment for uplink transmission within the preconfigured uplink resource subframe, wherein one or more other subframes for use by the user equipment include a normal cyclic prefix that is shorter in time than the extended cyclic prefix of the preconfigured uplink resource subframe; and
      receive from the user equipment, data via the resources allocated to the user equipment within the preconfigured uplink resource subframe,
   wherein the at least one memory and the computer program code configured to, with the at least one processor, cause the apparatus to:
   determine at least one of a size of the cell or a mobility status of the user equipment; and
   select the extended cyclic prefix, out of a plurality of cyclic prefix types or a plurality of cyclic prefix lengths, to be used for the preconfigured uplink resource subframe based on at least one of the size of the cell, or the mobility status of the user equipment.

14. The apparatus of claim 13, wherein the control information further comprises at least one of:
   control information indicating that a timing advance validation for the user equipment with respect to the cell has been disabled, or should be omitted, for the preconfigured uplink resource subframe;
   control information indicating one or more parameters of a timing advance validation criteria, such that the timing advance will be determined as valid when the cell, which provided the timing advance, is still a serving cell for the user equipment when a timing advance validation is performed by the user equipment;
   control information indicating that the preconfigured uplink resource subframe is marked as invalid for use with respect to other user equipments;
   control information indicating a length of the cyclic prefix, or a cyclic prefix type, for the preconfigured uplink resource subframe.

15. The apparatus of claim 13, wherein the at least one memory and the computer program code configured to, with the at least one processor, cause the apparatus to:
   transmit to the user equipment:
      a timing advance command instructing the user equipment to adjust the timing advance to an adjusted timing advance for the user equipment with respect to the cell, and
      control information instructing the user equipment to use the adjusted timing advance for transmission timing for the preconfigured uplink resource subframe while omitting a timing advance validation.

16. The apparatus of claim 13, wherein the at least one memory and the computer program code configured to, with the at least one processor, cause the apparatus to:
   determine at least one of the following:
      that the user equipment has a low mobility status or is stationary; or
      that the cell is a small cell having a size that is less than a threshold.

17. The apparatus of claim 13, wherein the user equipment comprises a first user equipment;
   wherein when transmitting, the at least one memory and the computer program code configured to, with the at least one processor, cause the apparatus to:
      transmit to the first user equipment having a normal or high mobility status, control information indicating resources allocated to the first user equipment for Idle mode uplink transmission within a first preconfigured uplink resource subframe, the first preconfigured uplink resource subframe including an extended cyclic prefix based on a normal mobility status or a high mobility status of the first user equipment; and wherein the at least one memory and the computer program code configured to, with the at least one processor, cause the apparatus to:

transmit to a second user equipment having a low or stationary mobility status, control information indicating resources allocated to the second user equipment for Idle mode uplink transmission within a second preconfigured uplink resource subframe, the second preconfigured uplink resource subframe including a normal cyclic prefix, which is shorter than the extended cyclic prefix, based on a low or stationary mobility status of the second user equipment.

* * * * *